United States Patent
Adiletta et al.

(10) Patent No.: US 6,728,845 B2
(45) Date of Patent: *Apr. 27, 2004

(54) SRAM CONTROLLER FOR PARALLEL PROCESSOR ARCHITECTURE AND METHOD FOR CONTROLLING ACCESS TO A RAM USING READ AND READ/WRITE QUEUES

(75) Inventors: Matthew J. Adiletta, Worcester, MA (US); William Wheeler, Southborough, MA (US); James Redfield, Hudson, MA (US); Daniel Cutter, Townsend, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/208,264

(22) Filed: Jul. 30, 2002

(65) Prior Publication Data

US 2003/0145159 A1 Jul. 31, 2003

Related U.S. Application Data

(63) Continuation of application No. 09/387,110, filed on Aug. 31, 1999, now Pat. No. 6,427,196.

(51) Int. Cl.[7] .............................................. G06F 13/00
(52) U.S. Cl. .......................... 711/154; 711/158; 710/39
(58) Field of Search .............................. 711/158, 151, 711/168, 169, 154; 710/39, 52, 54, 57, 112; 712/233

(56) References Cited

U.S. PATENT DOCUMENTS

| 3,373,408 | A | * | 3/1968 | Ling ........................ 712/228 |
|---|---|---|---|---|
| 5,432,918 | A | * | 7/1995 | Stamm ....................... 710/112 |
| 5,630,130 | A | | 5/1997 | Perotto et al. .............. 709/107 |
| 5,649,157 | A | * | 7/1997 | Williams ..................... 710/39 |
| 5,659,687 | A | * | 8/1997 | Kim et al. ................... 710/112 |
| 5,721,870 | A | * | 2/1998 | Matsumoto ................. 711/152 |
| 5,905,876 | A | * | 5/1999 | Pawlowski et al. ......... 710/112 |
| 5,948,081 | A | * | 9/1999 | Foster ......................... 710/52 |
| 6,070,231 | A | * | 5/2000 | Ottinger ..................... 711/141 |
| 6,092,158 | A | * | 7/2000 | Harriman et al. ........... 711/151 |
| 6,182,177 | B1 | * | 1/2001 | Harriman .................... 710/112 |
| 6,212,611 | B1 | * | 4/2001 | Nizar et al. ................ 711/169 |
| 6,247,025 | B1 | * | 6/2001 | Bacon ........................ 707/206 |
| 6,256,713 | B1 | * | 7/2001 | Audityan et al. ........... 711/141 |
| 6,427,196 | B1 | * | 7/2002 | Adiletta et al. ............. 711/158 |

OTHER PUBLICATIONS

"Multithreaded Processor Architectures", G.T. Byrd et al., IEEE Spectrum, IEEE Inc., New York, US, vol. 32, No. 8, 8–1–95, pps. 38–46.

* cited by examiner

Primary Examiner—Glenn Gossage
(74) Attorney, Agent, or Firm—Fish & Richardson P.C.

(57) ABSTRACT

A controller for a random access memory (RAM), such as a static ram (SRAM), includes an address and command queue that holds memory references from a plurality of microcontrol functional units. The address and command queue includes a read queue that stores read memory references. The controller also includes a first read/write queue that holds memory references from a core processor and control logic including an arbiter that detects the fullness of each of the queues and a status of completion of outstanding memory references to select a memory reference from one of the queues. The memory controller may be used in parallel processing systems and may also include an order queue, a lock lookup content addressable memory (CAM) and a read lock fail queue. A system including a media access controller (MAC), a network processor and an SRAM controller, and a method for controlling a RAM, are also described.

18 Claims, 18 Drawing Sheets

```
          31 30 29 28 27 26 25 24 23 22 21 20 19 18 17 16 15 14 13 12 11 10  9  8  7  6  5  4  3  2  1  0
         +--+--+--+--+--+--+--+--+--+--+--+--+--+--+--+--+--+--+--+--+--+--+--+--+--+--+--+--+--+--+--+--+
 CONTEXT |1 |1 |1 |1 |1 |1 |xxxxxxxxxxxxxxxxxxxxxx    |1 |1 |0 |db|xx|       wake-up event       |va|xxxxxxx|  ctx cmd  |
         +--+--+--+--+--+--+--+--+--+--+--+--+--+--+--+--+--+--+--+--+--+--+--+--+--+--+--+--+--+--+--+--+
```

Context Descriptors:

1) Wake-up Events (Bits 8-15)

0 = kill
   1 = voluntary
   2 = SRAM
   4 = SDRAM
   8 = FBI
   16 = INTER_THREAD
   32 = PCI_DMA_1
   64 = PCI_DMA_2
   128 = SEQ_NUM_LSB 2) db -> branch defer amount (Bit 17)

3) va -> value of sequence number (Bit 7)

4) OPCODE Bits (29-31)

5) cxt_cmd

FIG. 3B

SRAM CONTROLLER FOR PARALLEL PROCESSOR ARCHITECTURE AND METHOD FOR CONTROLLING ACCESS TO A RAM USING READ AND READ/WRITE QUEUES

This application is a continuation of U.S. patent application Ser. No. 09/387,110, filed Aug. 31, 1999, now U.S. Pat. No. 6,427,196.

BACKGROUND

This invention relates to memory controllers particularly for use in parallel processing systems.

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, a plurality of stations are provided with each capable of performing all tasks. That is, in general all or a plurality of the stations work simultaneously and independently on the same or common elements of a problem. Certain problems are suitable for solution by applying parallel processing.

Memory systems used in parallel processing tasks can be inefficient. Memory systems can have a dead time i.e., bubble that can either be 1 or 2 cycles depending on the type of memory device employed.

SUMMARY

According to an aspect of the present invention, a controller for a random access memory includes an address and command queue that holds memory references from a plurality of microcontrol functional units. The address and command queue includes a read queue and a first read/write queue that holds memory references from a core processor. The controller also includes control logic including an arbiter that detects the fullness of each of the queues and a status of completion of outstanding memory references to select a memory reference instruction from one of the queues.

One or more of the following advantages may be provided by one or more aspects of the invention.

The memory controller performs memory reference sorting to minimize delays (bubbles) in a pipeline from an interface to memory. The memory system is designed to be flooded with memory requests that are independent in nature. The memory controller enables memory reference sorting which reduces dead time or a bubble that occurs with accesses to static random access memory (SRAM). With memory references to SRAM, switching current direction on signal lines between reads and writes produces a bubble or a dead time while waiting for current to settle on conductors coupling the SRAM to the SRAM controller. That is, the drivers that drive current on the bus need to settle out prior to changing states. Thus, repetitive cycles of a read followed by a write can degrade peak bandwidth. Memory reference sorting organizes references to memory such that long strings of reads can be followed by long strings of writes. This can be used to minimize dead time in the pipeline to effectively achieve closer to maximum available bandwidth. Grouping reads and writes improves cycle-time by eliminating dead cycles. The memory controller performs memory reference sorting based on a read memory reference.

The memory controller can also include a lock lookup device for look-ups of read locks. The address and command queue also includes a read lock fail queue, to hold read memory reference requests that fail because of a lock existing on a portion of memory as determined by the lock lookup device.

BRIEF DESCRIPTION OF THE DRAWINGS

FIG. 3B is diagram that shows a format for a context switch instruction.

DESCRIPTION

Figure 1:
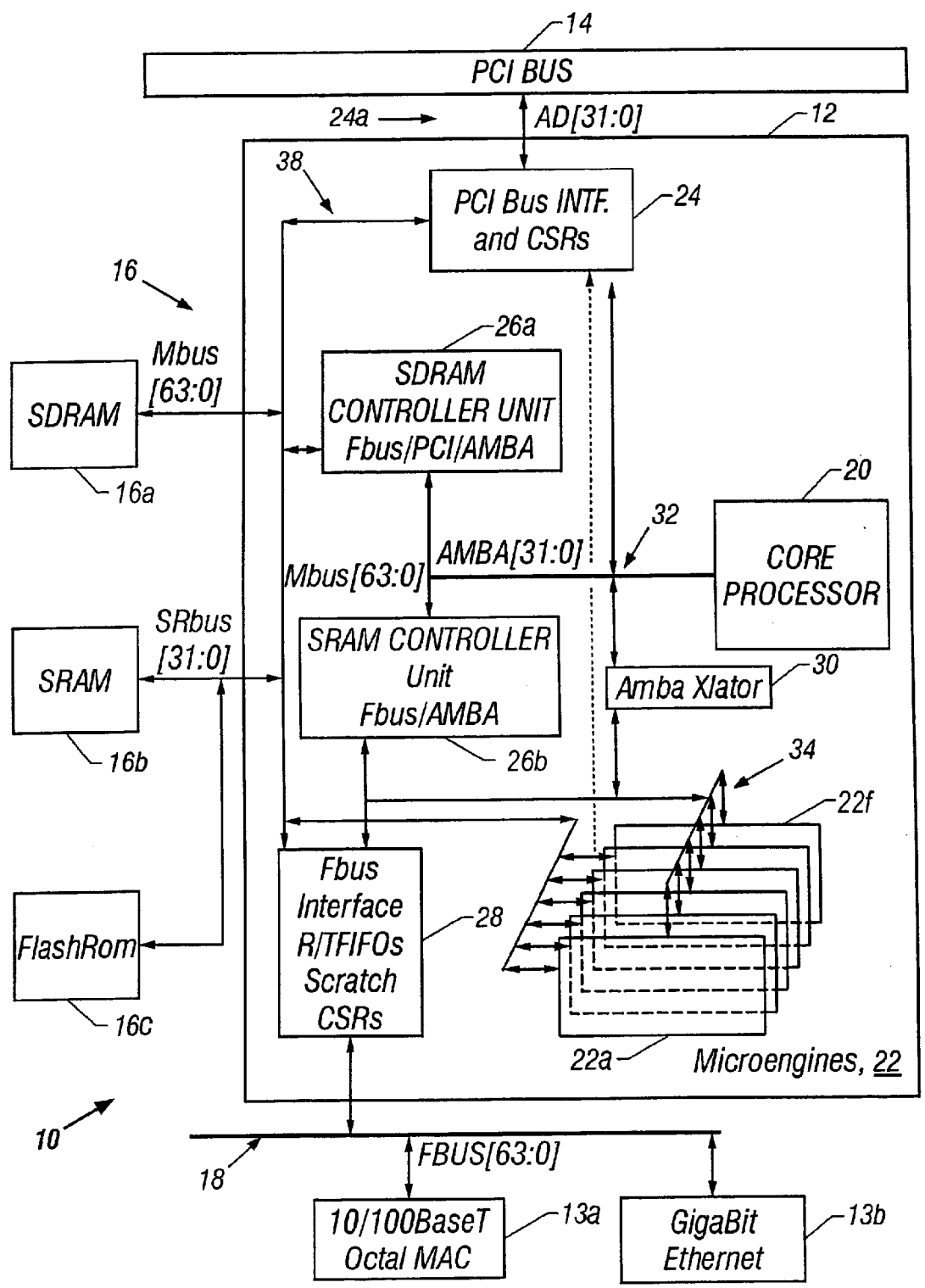
FIG. 1 is a block diagram of a communication system employing a hardware-based multithreaded processor.

Architecture:

Referring to FIG. 1, a communication system 10 includes a parallel, hardware-based multithreaded processor 12. The hardware-based multithreaded processor 12 is coupled to a bus such as a peripheral component interface (PCI) bus 14, a memory system 16 and a second bus 18. The system 10 is especially useful for tasks that can be broken into parallel subtasks or functions. Specifically hardware-based multithreaded processor 12 is useful for tasks that are bandwidth oriented rather than latency oriented. The hardware-based multithreaded processor 12 has multiple microengines 22a–22f each with multiple hardware controlled threads that can be simultaneously active and independently work on a task.

The hardware-based multithreaded processor 12 also includes a central controller or core processor 20 that assists in loading microcode control for other resources of the hardware-based multithreaded processor 12 and performs other general purpose computer type functions such as handling protocols, exceptions, extra support for packet processing where the microengines pass the packets off for more detailed processing such as in boundary conditions. In one embodiment, the central controller or core processor 20 is a Strong Arm® (Arm is a trademark of ARM Limited, United Kingdom) based architecture. The general purpose microprocessor 20 has an operating system. Through the operating system the central controller or core processor 20 can call functions to operate on microengines 22a–22f. The central controller or core processor 20 can use any supported operating system preferably a real time operating system. For the central controller or core processor implemented as a Strong Arm architecture, operating systems such as, MicrosoftNT® (Microsoft Corporation, Redmond Wash.) real-time, VXWorks®(Wind River Systems, Sunnyvale, Calif.) and µ-CUS, a freeware operating system available over the Internet, can be used.

The hardware-based multithreaded processor 12 also includes a plurality of function microengines 22a–22f. Functional microengines (microengines) 22a–22f each maintain a plurality of program counters in hardware and states associated with the program counters. Effectively, a corresponding plurality of sets of threads can be simultaneously active on each of the microengines 22a–22f while only one is actually executing at any one time.

In one embodiment, there are six microengines 22a–22f as shown. Each microengines 22a–22f has capabilities for processing four hardware threads. The six microengines 22a–22f operate with shared resources including memory system 16 and bus interfaces 24 and 28. The memory system 16 includes a SDRAM controller unit 26a and a SRAM controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the central processor or core processor 20, and so forth.

The six microengines 22a–22f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16a. The microengines 22a–22f can execute memory reference instructions to either the SDRAM controller 26a or SRAM controller 26b.

Advantages of hardware multithreading can be explained by SRAM or SDRAM memory accesses. As an example, an SRAM access requested by a Thread_0, from a microengine will cause the SRAM controller 26b to initiate an access to the SRAM memory 16b. The SRAM controller controls arbitration for the SRAM bus, accesses the SRAM 16b, fetches the data from the SRAM 16b, and returns data to a requesting microengine 22a–22b. During an SRAM access, if the microengine e.g., 22a had only a single thread that could operate, that microengine would be dormant until data was returned from the SRAM. By employing hardware context swapping within each of the microengines 22a–22f, the hardware context swapping enables other contexts with unique program counters to execute in that same microengine. Thus, another thread e.g., Thread_1 can function while the first thread, e.g., Thread_0, is awaiting the read data to return. During execution, Thread_1 may access the SDRAM memory 16a. While Thread_1 operates on the SDRAM unit, and Thread_0 is operating on the SRAM unit, a new thread, e.g., Thread_2 can now operate in the microengine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one microengine 22a and have one more thread available to process more work in the data path.

The hardware context swapping also synchronizes completion of tasks. For example, two threads could hit the same shared resource e.g., SRAM. Each one of these separate functional units, e.g., the first in first out bus (FBUS) interface 28, the SRAM controller 26a, and the SDRAM controller 26b, when they complete a requested task from one of the microengine thread contexts reports back a flag signaling completion of an operation. When the flag is received by the microengine, the microengine can determine which thread to turn on.

One example of an application for the hardware-based multithreaded processor 12 is as a network processor. As a network processor, the hardware-based multithreaded processor 12 interfaces to network devices such as a media access controller (MAC) device e.g., a 10/100BaseT Octal MAC controller 13a or a Gigabit Ethernet device 13b. In general, as a network processor, the hardware-based multithreaded processor 12 can interface to any type of communication device or interface that receives/sends large amounts of data. Communication system 10 functioning in a networking application could receive a plurality of network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, i.e., a redundant array of independent disks (RAID) storage. A further use is as a matching engine. In the securities industry for example, the advent of electronic trading requires the use of electronic matching engines to match orders between buyers and sellers. These and other parallel types of tasks can be accomplished on the system 10.

The processor 12 includes a bus interface 28 that couples the processor to the second bus 18. Bus interface 28 in one embodiment couples the processor 12 to the so-called FBUS 18. The FBUS interface 28 is responsible for controlling and interfacing the processor 12 to the FBUS 18. The FBUS 18 is a 64-bit wide FIFO bus, used to interface to MAC devices.

The processor 12 includes a second interface e.g., a PCI bus interface 24 that couples other system components that reside on the PCI 14 bus to the processor 12. The PCI bus interface 24, provides a high speed data path 24a to memory 16 e.g., the SDRAM memory 16a. Through that path, data can be moved quickly from the SDRAM 16a through the PCI bus 14, via direct memory access (DMA) transfers. The hardware based multithreaded processor 12 supports image transfers. The hardware based multithreaded processor 12 can employ a plurality of DMA channels so if one target of a DMA transfer is busy, another one of the DMA channels can take over the PCI bus to deliver information to another target to maintain high processor 12 efficiency. Additionally, the PCI bus interface 24 supports target and master operations. Target operations are operations where slave devices on bus 14 access SDRAMs through reads and writes that are serviced as a slave to target operations. In master operations, the processor core 20 sends data directly to or receives data directly from the PCI interface 24.

Each of the functional units are coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceeds the bandwidth of external buses coupled to the processor 12. The processor 12 includes an internal core processor bus 32, e.g., an Advanced System bus (ASB) or AMBA bus that couples the processor core 20 to the memory controller 26a, 26b and to an ASB or AMBA translator 30 described below. The ASB bus is a subset of the so called AMBA bus that is used with the Strong Arm processor core. The processor 12 also includes a private bus 34 that couples the microengine units to SRAM controller 26b, ASB translator 30 and FBUS interface 28. A memory bus 38 couples the memory controller 26a, 26b to the bus interfaces 24 and 28 and memory system 16 including flash read only memory (flashROM) 16c used for boot operations and so forth.

Figure 2A:
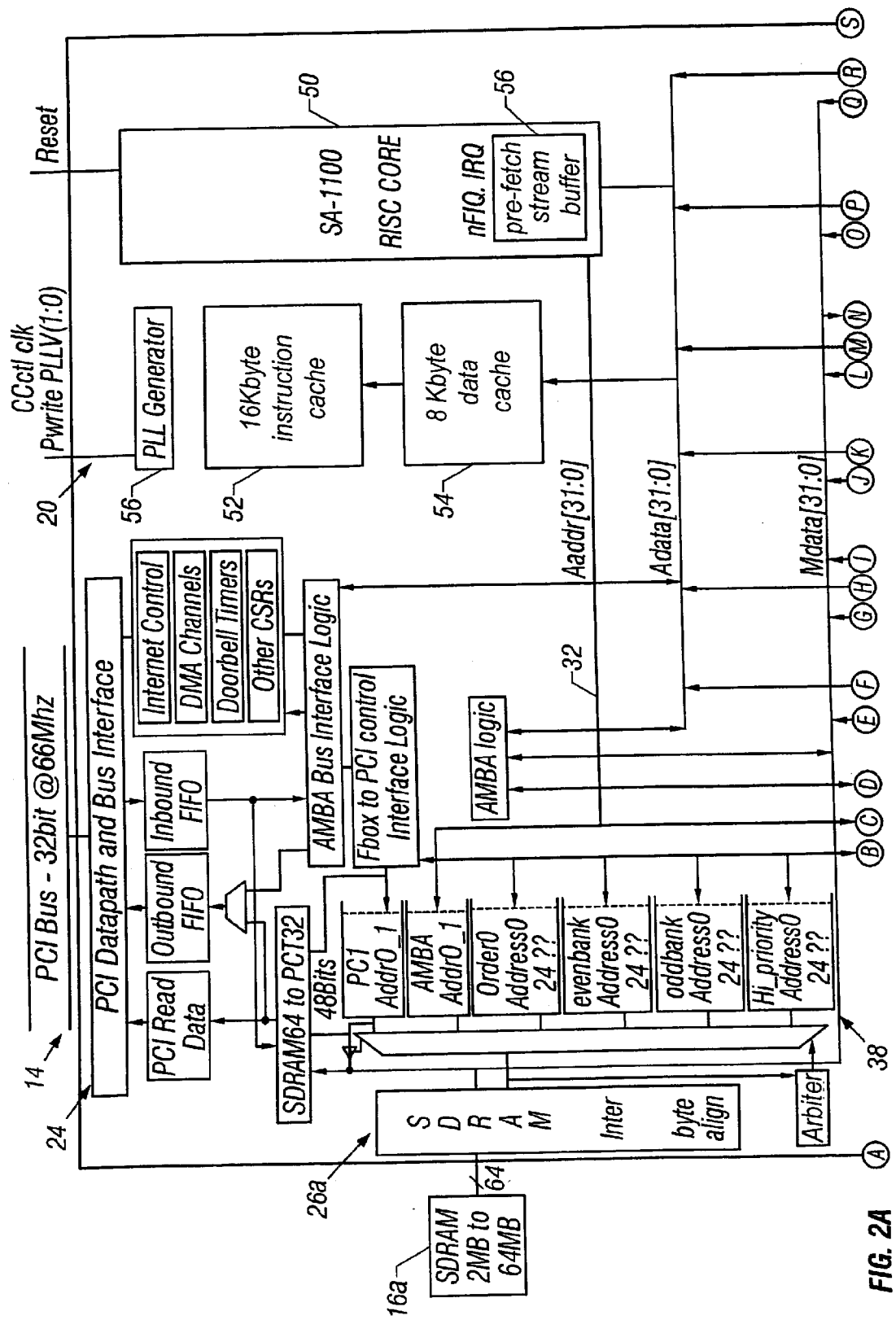
FIGS. 2A–2B are a detailed block diagram of the hardware-based multithreaded processor of FIG. 1.
Figure 2B:
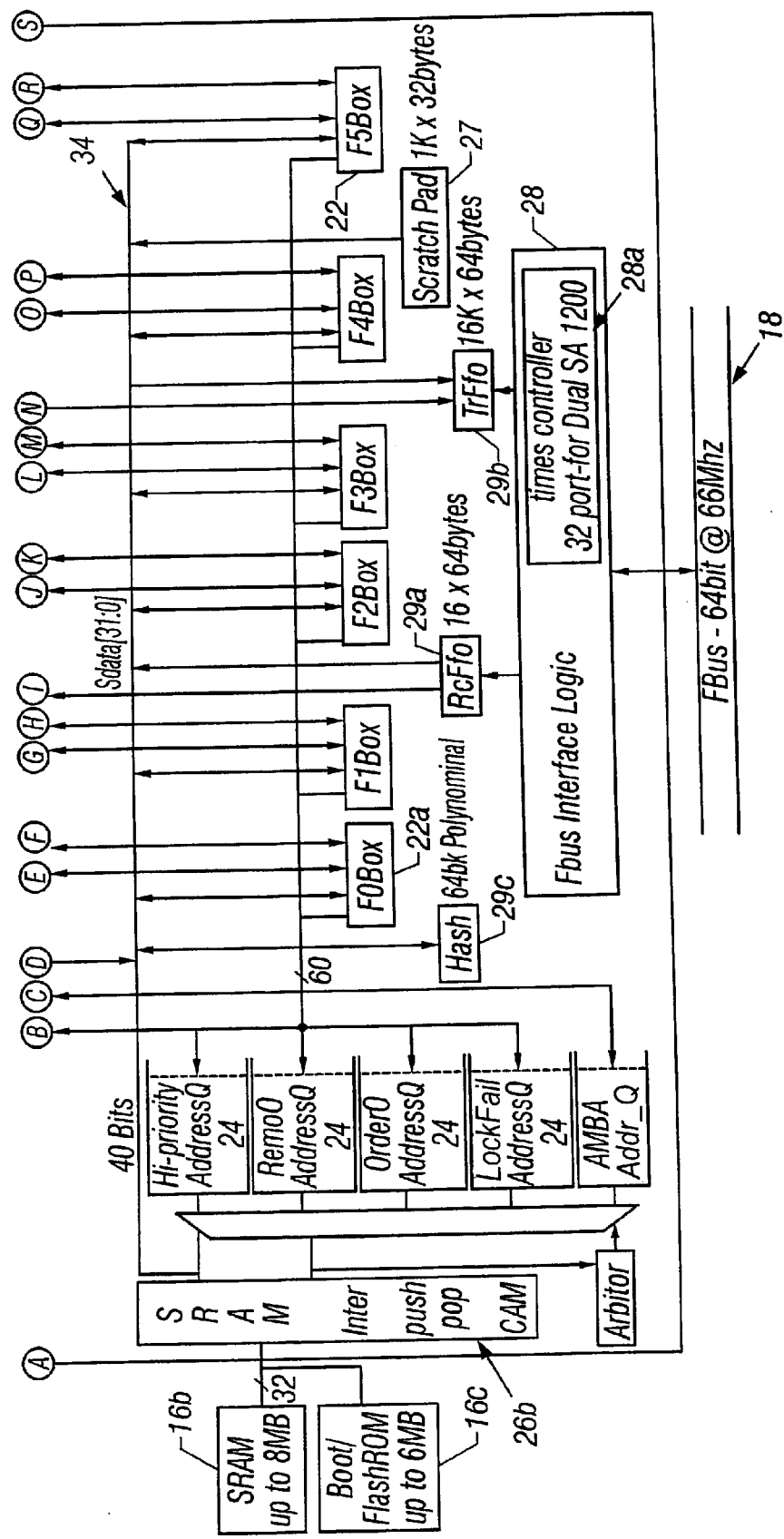

Referring to FIGS. 2A–2B, each of the microengines 22a–22f includes an arbiter that examines flags to determine the available threads to be operated upon. Any thread from any of the microengines 22a–22f can access the SDRAM controller 26a, SRAM controller 26b or FBUS interface 28. The memory controllers 26a and 26b each include a plurality of queues to store outstanding memory reference requests. The queues either maintain order of memory references or arrange memory references to optimize memory bandwidth. For example, if a thread_0 has no dependencies or relationship to a thread_1, there is no reason that thread 1 and 0 cannot complete their memory references to the SRAM unit out of order. The microengines 22a–22f issue memory reference requests to the memory controllers 26a and 26b. The microengines 22a–22f flood the memory controllers 26a and 26b with enough memory reference operations such that the memory controllers 26a and 26b become the bottleneck for processor 12 operation.

If the memory subsystem 16 is flooded with memory requests that are independent in nature, the processor 12 can perform memory reference sorting. Memory reference sorting improves achievable memory bandwidth. Memory reference sorting, as described below, reduces dead time or a bubble that occurs with accesses to SRAM. With memory references to SRAM, switching current direction on signal lines between reads and writes produces a bubble or a dead time waiting for current to settle on conductors coupling the SRAM 16b to the SRAM controller 26b.

That is, the drivers that drive current on the bus need to settle out prior to changing states. Thus, repetitive cycles of a read followed by a write can degrade peak bandwidth. Memory reference sorting allows the processor 12 to organize references to memory such that long strings of reads can be followed by long strings of writes. This can be used to minimize dead time in the pipeline to effectively achieve closer to maximum available bandwidth. Reference sorting helps maintain parallel hardware context threads. On the SDRAM, reference sorting allows hiding of pre-charges from one bank to another bank. Specifically, if the memory system 16b is organized into an odd bank and an even bank, while the processor is operating on the odd bank, the memory controller can start precharging the even bank. Precharging is possible if memory references alternate between odd and even banks. By ordering memory references to alternate accesses to opposite banks, the processor 12 improves SDRAM bandwidth. Additionally, other optimizations can be used. For example, merging optimizations where operations that can be merged, are merged prior to memory access, open page optimizations where by examining addresses an opened page of memory is not reopened, chaining, as will be described below, and refreshing mechanisms, can be employed.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a microprogrammable source/destination/protocol hashed lookup (used for address smoothing) in SRAM. If the hash does not successfully resolve, the packet header is sent to the processor core 20 for additional processing. The FBUS interface 28 supports the following internal data transactions:

| FBUS unit | (Shared bus SRAM) | to/from microengine. |
| FBUS unit | (via private bus) | writes from SDRAM Unit. |
| FBUS unit | (via Mbus) | Reads to SDRAM. |

The FBUS 18 is a standard industry bus and includes a data bus, e.g., 64 bits wide and sideband control for address and read/write control. The FBUS interface 28 provides the ability to input (receive) and output (transmit) large amounts of data using a series of input and output FIFO=s 29a–29b. From the FIFOs 29a–29b, the microengines 22a–22f fetch data from or command the SDRAM controller 26a to move data from a receive FIFO in which data has come from a device on bus 18, into the FBUS interface 28. The data can be sent through memory controller 26a to SDRAM memory 16a, via a direct memory access. Similarly, the microengines can move data from the SDRAM 26a to interface 28, out to FBUS 18, via the FBUS interface 28.

Data functions are distributed amongst the microengines. Connectivity to the SRAM controller 26a, SDRAM controller 26b and FBUS interface 28 is via command requests. A command request can be a memory request or an FBUS request. For example, a command request can move data from a register located in a microengine 22a to a shared resource, e.g., an SDRAM location, SRAM location, flashROM memory or some MAC address. The commands are sent out to each of the functional units and the shared resources. However, the shared resources do not need to maintain local buffering of the data. Rather, the shared resources access distributed data located inside of the microengines. This enables microengines 22a–22f, to have local access to data rather than arbitrating for access on a bus and risk contention for the bus. With this feature, there is a 0 cycle stall for waiting for data internal to the microengines 22a–22f.

The data buses, e.g., ASB bus 32, SRAM bus 34 and SDRAM bus 38 coupling these shared resources, e.g., memory controllers 26a and 26b are of sufficient bandwidth such that there are no internal bottlenecks. Thus, in order to avoid bottlenecks, the processor 12 has a bandwidth requirement where each of the functional units is provided with at least twice the maximum bandwidth of the internal buses. As an example, the SDRAM can run a 64 bit wide bus at 83 MHz. The SRAM data bus could have separate read and write buses, e.g., could be a read bus of 32 bits wide running at 166 MHz and a write bus of 32 bits wide at 166 MHz. That is, in essence, 64 bits running at 166 MHz which is effectively twice the bandwidth of the SDRAM.

The core processor 20 also can access the shared resources. The core processor 20 has a direct communication to the SDRAM controller 26a to the bus interface 24 and to SRAM controller 26b via bus 32. However, to access the microengines 22a–22f and transfer registers located at any of the microengines 22a–22f, the core processor 20 accesses the microengines 22a–22f via the ASB Translator 30 over bus 34. The ASB translator 30 can physically reside in the FBUS interface 28, but logically is distinct. The ASB Translator 30 performs an address translation between FBUS microengine transfer register locations and core processor addresses (i.e., ASB bus) so that the core processor 20 can access registers belonging to the microengines 22a–22c.

Although microengines 22 can use the register set to exchange data as described below, a scratchpad memory 27 is also provided to permit microengines to write data out to the memory for other microengines to read. The scratchpad 27 is coupled to bus 34.

The processor core 20 includes a RISC core 50 implemented in a five stage pipeline performing a single cycle shift of one operand or two operands in a single cycle, provides multiplication support and 32 bit barrel shift support. This RISC core 50 is a standard Strong Arm® architecture but it is implemented with a five stage pipeline for performance reasons. The processor core 20 also includes a 16 kilobyte instruction cache 52, an 8 kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus 32.

Figure 3:
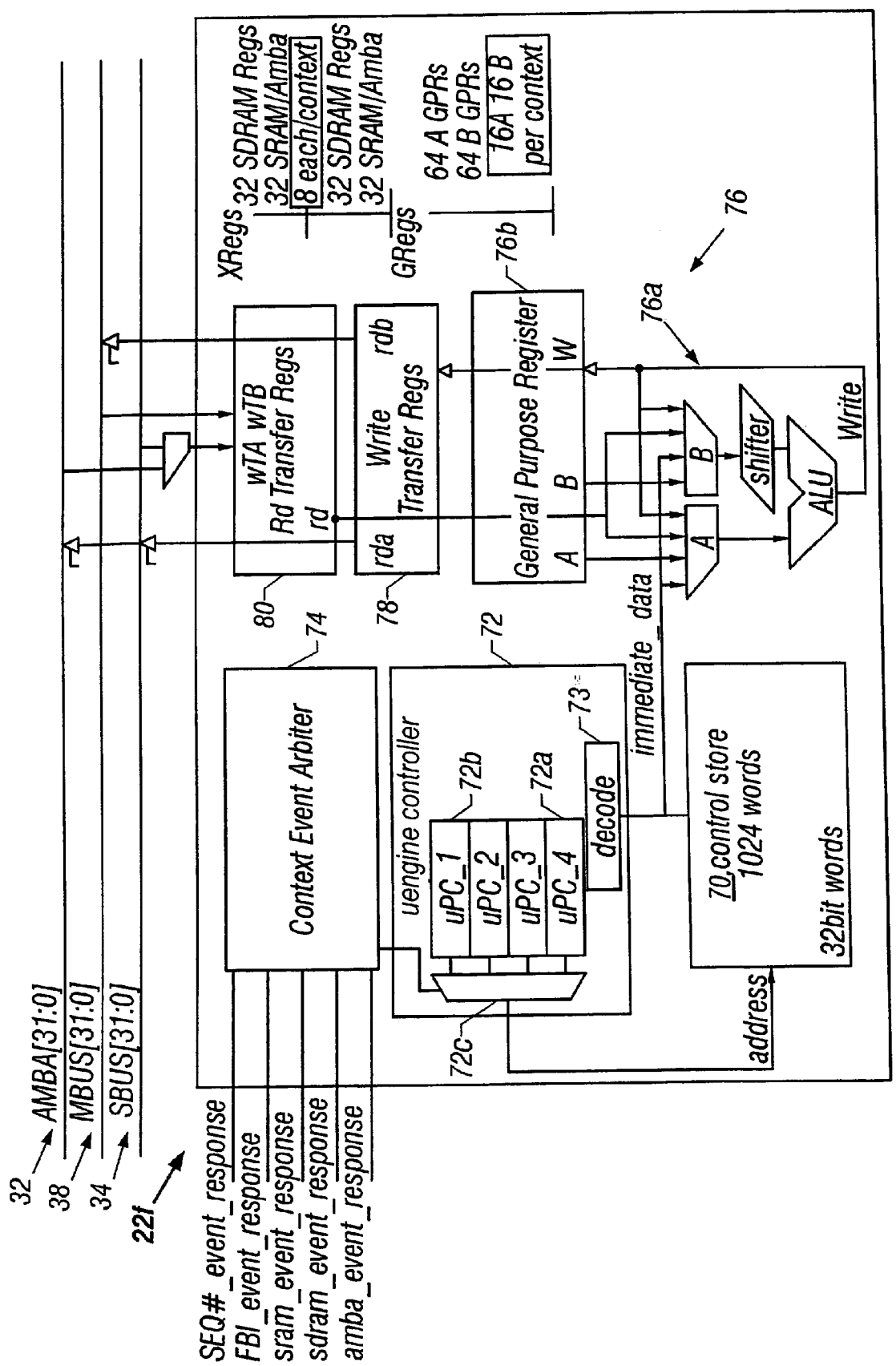
FIG. 3 is a block diagram of a microengine functional unit employed in the hardware-based multithreaded processor of FIGS. 1 and 2A–2B.

Microengines:

Referring to FIG. 3, an exemplary one of the microengines 22a–22f, e.g., microengine 22f is shown. The microengine includes a control store 70 which, in one implementation, includes a random access memory (RAM) of 1,024 words of 32 bits. The RAM stores a microprogram. The microprogram is loadable by the core processor 20. The microengine 22f also includes controller logic 72. The controller logic includes an instruction decoder 73 and program counter (PC) units 72a–72d. The four micro program counters 72a–72d are maintained in hardware. The microengine 22f also includes context event arbiter or switching logic 74. Context event logic 74 receives messages (e.g., SEQ_#_EVENT_RESPONSE; FBI_EVENT_RESPONSE; SRAM_EVENT_RESPONSE; SDRAM_EVENT_RESPONSE; and AMBA_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The microengine 22f can have a maximum of e.g., 4 threads available.

In addition to event signals that are local to an executing thread, the microengines 22 employ signaling states that are global. With signaling states, an executing thread can broadcast a signal state to all microengines 22. Any and all threads in the microengines can branch on these signaling states. These signaling states can be used to determine availability of a resource or whether a resource is due for servicing.

The context event arbiter or logic 74 has arbitration for the four (4) threads. In one embodiment, the arbitration is a round robin mechanism. Other techniques could be used including priority queuing or weighted fair queuing. The microengine 22f also includes an execution box (EBOX) data path 76 that includes an arithmetic logic unit 76a and general purpose register set 76b. The arithmetic logic unit 76a performs arithmetic and logical functions as well as shift functions. The registers set 76b has a relatively large number of general purpose registers. As will be described in FIG. 3B, in this implementation there are 64 general purpose registers in a first bank, Bank A and 64 in a second bank, Bank B. The general purpose registers are windowed as will be described so that they are relatively and absolutely addressable.

The microengine 22f also includes a write transfer register stack 78 and a read transfer register stack 80. These registers are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74 which will then alert the thread that the data is available or has been sent. Both transfer register banks 78 and 80 are connected to the execution box (EBOX) 76 through a data path. In one implementation, the read transfer register stack 80 has 64 registers and the write transfer register stack 78 has 64 registers.

Figure 3A:
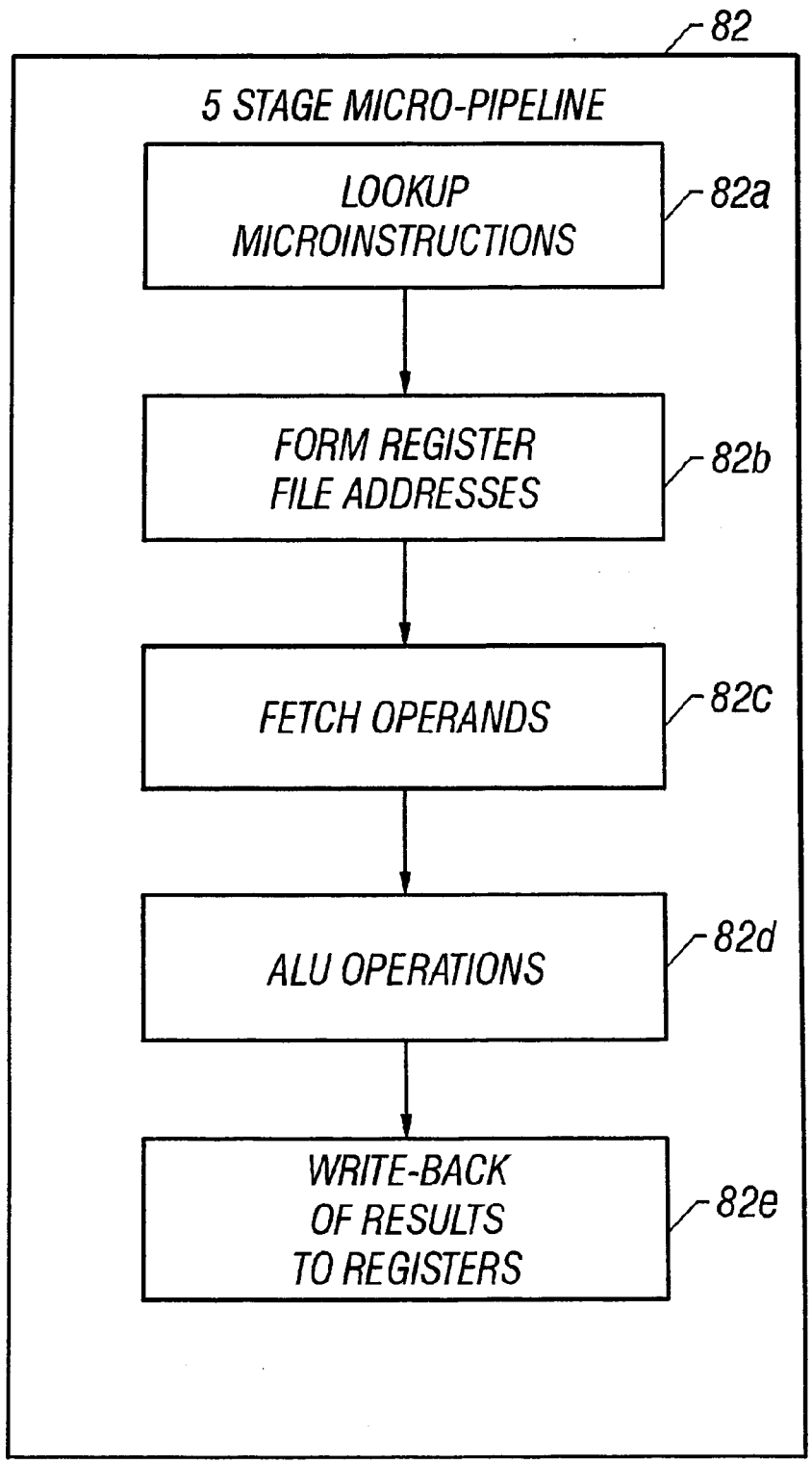
FIG. 3A is a block diagram of a pipeline in the microengine of FIG. 3.

As shown in FIG. 3A, the microengine datapath maintains a 5-stage micro-pipeline 82. This pipeline includes lookup of microinstruction words 82a, formation of the register file addresses 82b, read or fetch of operands from register file 82c, ALU, shift or compare operations 82d, and write-back of results to registers 82e. By providing a write-back data bypass into the ALU/shifter units, and by assuming the registers are implemented as a register file (rather than a RAM), the microengine can perform a simultaneous register file read and write, which completely hides the write operation.

The SDRAM interface 26a provides a signal back to the requesting microengine on reads that indicates whether a parity error occurred on the read request. The microengine microcode is responsible for checking the SDRAM read Parity flag when the microengine uses any return data. Upon checking the flag, if it was set, the act of branching on it clears it. The Parity flag is only sent when the SDRAM is enabled for checking, and the SDRAM is parity protected. The microengines and the PCI Unit are the only requesters notified of parity errors. Therefore, if the processor core 20 or FIFO requires parity protection, a microengine assists in the request. The microengines 22a–22f support conditional branches. The worst case conditional branch latency (not including jumps) occurs when the branch decision is a result of condition codes being set by the previous microcontrol instruction. The latency is shown below in Table 1:

| | 1 | 2 | 3 | 4 | 5 | 6 | 7 | 8 |
|---|---|---|---|---|---|---|---|---|
| microstore lookup | n1 | cb | n2 | XX | b1 | b2 | b3 | b4 |
| reg addr gen | | n1 | cb | XX | XX | b1 | b2 | b3 |
| reg file lookup | | | n1 | cb | XX | XX | b1 | b2 |
| ALU/shifter/cc | | | | n1 | cb | XX | XX | b1 |
| write back | | | | m2 | | n1 | cb | XX | XX | where nx is pre-branch microword (n1 sets cc's)
cb is conditional branch
bx is post-branch microword
XX is aborted microword As shown in Table 1, it is not until cycle 4 that the condition codes of n1 are set, and the branch decision can be made (which in this case causes the branch path to be looked up in cycle 5). The microengine incurs a 2-cycle branch latency penalty because it must abort operations n2 and n3 (the 2 microwords directly after the branch) in the pipe, before the branch path begins to fill the pipe with operation b1. If the branch is not taken, no microwords are aborted and execution continues normally. The microengines have several mechanisms to reduce or eliminate the effective branch latency.

The microengines support deferred branches. Deferring branches are when a microengine allows 1 or 2 microwords after the branch to occur before the branch takes effect (i.e. the effect of the branch is "deferred" in time). Thus, if useful work can be found to fill the wasted cycles after the branch microword, then the branch latency can be hidden. A 1-cycle deferred branch is shown below where n2 is allowed to execute after cb, but before b1:

|  | 1 | 2 | 3 | 4 | 5 | 6 | 7 | 8 |
|---|---|---|---|---|---|---|---|---|
| microstore lookup | n1 | cb | n2 | XX | b1 | b2 | b3 | b4 |
| reg addr gen |  | n1 | cb | n2 | XX | b1 | b2 | b3 |
| reg file lookup |  |  | n1 | cb | n2 | XX | b1 | b2 |
| ALU/shifter/cc |  |  |  | n1 | cb | n2 | XX | b1 |
| write back |  |  |  |  | n1 | cb | n2 | XX |

A 2-cycle deferred branch is shown below, where n2 and n3 are both allowed to complete before the branch to b1 occurs. Note that a 2-cycle branch deferment is only allowed when the condition codes are set on the microword preceding the branch.

|  | 1 | 2 | 3 | 4 | 5 | 6 | 7 | 8 | 9 |
|---|---|---|---|---|---|---|---|---|---|
| microstore lookup | n1 | cb | n2 | n3 | b1 | b2 | b3 | b4 | b5 |
| reg addr gen |  | n1 | cb | n2 | n3 | b1 | b2 | b3 | b4 |
| reg file lkup |  |  | n1 | cb | n2 | n3 | b1 | b2 | b3 |
| ALU/shftr/cc |  |  |  | n1 | cb | n2 | n3 | b1 | b2 |
| write back |  |  |  |  | n1 | cb | n2 | n3 | b1 |

The microengines also support condition code evaluation. If the condition codes upon which a branch decision are made are set 2 or more microwords before the branch, then 1 cycle of branch latency can be eliminated because the branch decision can be made 1 cycle earlier:

|  | 1 | 2 | 3 | 4 | 5 | 6 | 7 | 8 |
|---|---|---|---|---|---|---|---|---|
| microstore lookup | n1 | n2 | cb | XX | b1 | b2 | b3 | b4 |
| reg addr gen |  | n1 | n2 | cb | XX | b1 | b2 | b3 |
| reg file lookup |  |  | n1 | n2 | cb | XX | b1 | b2 |
| ALU/shifter/cc |  |  |  | n1 | n2 | cb | XX | b1 |
| write back |  |  |  |  | n1 | n2 | cb | XX |

In this example, n1 sets the condition codes and n2 does not set the conditions codes. Therefore, the branch decision can be made at cycle 4 (rather than 5), to eliminate 1 cycle of branch latency. In the example below, the 1-cycle branch deferment and early setting of condition codes are combined to completely hide the branch latency:
Condition codes (cc's) set 2 cycles before a 1-cycle deferred branch:

|  | 1 | 2 | 3 | 4 | 5 | 6 | 7 | 8 |
|---|---|---|---|---|---|---|---|---|
| microstore lookup | n1 | n2 | cb | n3 | b1 | b2 | b3 | b4 |
| reg addr gen |  | n1 | n2 | cb | n3 | b1 | b2 | b3 |
| reg file lookup |  |  | n1 | n2 | cb | n3 | b1 | b2 |
| ALU/shifter/cc |  |  |  | n1 | n2 | cb | n3 | b1 |
| write back |  |  |  |  | n1 | n2 | cb | n3 |

In the case where the condition codes cannot be set early (i.e. they are set in the microword preceding the branch), the microengine supports branch guessing which attempts to reduce the 1 cycle of exposed branch latency that remains.

By "guessing" the branch path or the sequential path, the microsequencer pre-fetches the guessed path 1 cycle before it definitely knows what path to execute. If it guessed correctly, 1 cycle of branch latency is eliminated as shown below:
guess branch taken/branch is taken

|  | 1 | 2 | 3 | 4 | 5 | 6 | 7 | 8 |
|---|---|---|---|---|---|---|---|---|
| microstore lookup | n1 | cb | n1 | b1 | b2 | b3 | b4 | b5 |
| reg addr gen |  | n1 | cb | XX | b1 | b2 | b3 | b4 |
| reg file lookup |  |  | n1 | cb | XX | b1 | b2 | b3 |
| ALU/shifter/cc |  |  |  | n1 | cb | XX | b1 | b2 |
| write back |  |  |  |  | n1 | cb | XX | b1 |

If the microcode guessed a branch taken incorrectly, the microengine still only wastes 1 cycle:
guess branch taken/branch is NOT taken

|  | 1 | 2 | 3 | 4 | 5 | 6 | 7 | 8 |
|---|---|---|---|---|---|---|---|---|
| microstore lookup | n1 | cb | n1 | XX | n2 | n3 | n4 | n5 |
| reg addr gen |  | n1 | cb | n1 | XX | n2 | n3 | n4 |
| reg file lookup |  |  | n1 | cb | n1 | XX | n2 | n3 |
| ALU/shifter/cc |  |  |  | n1 | cb | n1 | XX | n2 |
| write back |  |  |  |  | n1 | cb | n1 | XX |

However, the latency penalty is distributed differently when microcode guesses a branch is not taken:
For guess branch NOT taken/branch is NOT taken there are no wasted cycles as set out below.

|  | 1 | 2 | 3 | 4 | 5 | 6 | 7 | 8 |
|---|---|---|---|---|---|---|---|---|
| microstore lookup | n1 | cb | n1 | n2 | n3 | n4 | n5 | n6 |
| reg addr gen |  | n1 | cb | n1 | n2 | n3 | n4 | n5 |
| reg file lookup |  |  | n1 | cb | n1 | n2 | n3 | n4 |
| ALU/shifter/cc |  |  |  | n1 | cb | n1 | n2 | n3 |
| write back |  |  |  |  | n1 | cb | n1 | n2 |

However for guess branch NOT taken/branch is taken there are 2 wasted cycles.

|  | 1 | 2 | 3 | 4 | 5 | 6 | 7 | 8 |
|---|---|---|---|---|---|---|---|---|
| microstore lookup | n1 | cb | n1 | XX | b1 | b2 | b3 | b4 |
| reg addr gen |  | n1 | cb | XX | XX | b1 | b2 | b3 |
| reg file lookup |  |  | n1 | cb | XX | XX | b1 | b2 |
| ALU/shifter/cc |  |  |  | n1 | cb | XX | XX | b1 |
| write back |  |  |  |  | n1 | cb | XX | XX |

The microengine can combine branch guessing with 1-cycle branch deferment to improve the result further. For guess branch taken with 1-cycle deferred branch/branch is taken is:

|  | 1 | 2 | 3 | 4 | 5 | 6 | 7 | 8 |
|---|---|---|---|---|---|---|---|---|
| microstore lookup | n1 | cb | n2 | b1 | b2 | b3 | b4 | b5 |
| reg addr gen |  | n1 | cb | n2 | b1 | b2 | b3 | b4 |
| reg file lookup |  |  | n1 | cb | n2 | b1 | b2 | b3 |

-continued

|  | 1 | 2 | 3 | 4 | 5 | 6 | 7 | 8 |
|---|---|---|---|---|---|---|---|---|
| ALU/shifter/cc |  |  |  | n1 | cb | n2 | b1 | b2 |
| write back |  |  |  |  | n1 | cb | n2 | b1 |

In the case above, the 2 cycles of branch latency are hidden by the execution of n2, and by correctly guessing the branch direction. If microcode guesses incorrectly, 1 cycle of branch latency remains exposed as shown below:

guess branch taken with 1-cycle deferred branch/branch is NOT taken

|  | 1 | 2 | 3 | 4 | 5 | 6 | 7 | 8 | 9 |
|---|---|---|---|---|---|---|---|---|---|
| microstore lookup | n1 | cb | n2 | XX | n3 | n4 | n5 | n6 | n7 |
| reg addr gen |  | n1 | cb | n2 | XX | n3 | n4 | n5 | n6 |
| reg file lkup |  |  | n1 | cb | n2 | XX | n3 | n4 | n5 |
| ALU/shftr/cc |  |  |  | n1 | cb | n2 | XX | n3 | n4 |
| write back |  |  |  |  | n1 | cb | n2 | XX | n3 |

If microcode correctly guesses a branch NOT taken, then the pipeline flows sequentially in the normal unperturbed case. If microcode incorrectly guesses branch NOT taken, the microengine again exposes 1 cycle of unproductive execution as shown below:

guess branch NOT taken/branch is taken

|  | 1 | 2 | 3 | 4 | 5 | 6 | 7 | 8 | 9 |
|---|---|---|---|---|---|---|---|---|---|
| microstore lookup | n1 | cb | n2 | XX | b1 | b2 | b3 | b4 | b5 |
| reg addr gen |  | n1 | cb | n2 | XX | b1 | b2 | b3 | b4 |
| reg file lkup |  |  | n1 | cb | n2 | XX | b1 | b2 | b3 |
| ALU/shftr/cc |  |  |  | n1 | cb | n2 | XX | b1 | b2 |
| write back |  |  |  |  | n1 | cb | n2 | XX | b1 | where nx is pre-branch microword (n1 sets cc's)
cb is conditional branch
bx is post-branch microword
XX is aborted microword In the case of a jump instruction, 3 extra cycles of latency are incurred because the branch address is not known until the end of the cycle in which the jump is in the ALU stage:

|  | 1 | 2 | 3 | 4 | 5 | 6 | 7 | 8 | 9 |
|---|---|---|---|---|---|---|---|---|---|
| microstore lookup | n1 | jp | XX | XX | XX | j1 | j2 | j3 | j4 |
| reg addr gen |  | n1 | jp | XX | XX | XX | j1 | j2 | j3 |
| reg file lkup |  |  | n1 | jp | XX | XX | XX | j1 | j2 |
| ALU/shftr/cc |  |  |  | n1 | jp | XX | XX | XX | j1 |
| write back |  |  |  |  | n1 | jp | XX | XX | XX |

Context Switch:

Referring to FIG. 3B, a format from a context switch instruction is shown. A context switch is a special form of a branch that causes a different context (and associated PC) to be selected. Context switching introduces some branch latency as well. Consider the following context switch:

|  | 1 | 2 | 3 | 4 | 5 | 6 | 7 | 8 | 9 |
|---|---|---|---|---|---|---|---|---|---|
| microstore lookup | o1 | ca | br | n1 | n2 | n3 | n4 | n5 | n6 |
| reg addr gen |  | o1 | ca | XX | n1 | n2 | n3 | n4 | n5 |
| reg file lkup |  |  | o1 | ca | XX | n1 | n2 | n3 | n4 |
| ALU/shftr/cc |  |  |  | o1 | ca | XX | n1 | n2 | n3 |
| write back |  |  |  |  | o1 | ca | XX | n1 | n2 | where ox is old context flow
br is branch microword in old context
ca is context rearbitration (causes context switch)
nx is new context flow
XX is aborted microword In a context switch the "br" microword is aborted to avoid control and timing complexities that could be caused by saving the correct old context PC.

Conditional branches that operate on ALU condition codes which are set on the microword before the branch can select 0, 1 or 2-cycle branch deferment modes. Condition codes set 2 or more microwords before the conditional branch that operates on them can select 0 or 1-cycle branch deferment modes. All other branches (including context rearbitrations) can select either 0 or 1-cycle branch deferment modes. The architecture could be designed to make a context arbitration microword within a branch deferment window of a preceding branch, jump or context arbitration microword, an illegal option. That is, in some embodiments, a context switch would not be allowed to occur during a branch transition in the pipeline because as mentioned, it could unduly complicate saving of the old context PC. The architecture could also be designed to make branching within the branch deferment window of a preceding branch, jump or context arbitration microword illegal to avoid complicated and possible unpredictable branch behaviors.

Each microengine 22a–22f supports multi-threaded execution of four contexts. One reason for this is to allow one thread to start executing just after another thread issues a memory reference and must wait until that reference completes before doing more work. This behavior is critical to maintaining efficient hardware execution of the micro engines because memory latency is significant. Stated differently, if only a single thread execution was supported, the microengines would sit idle for a significant number of cycles waiting for references to return and thereby reduce overall computational throughput. Multi-threaded execution allows microengines to hide memory latency by performing useful independent work across several threads. Two synchronization mechanisms are supplied in order to allow a thread to issue an SRAM or SDRAM reference, and then subsequently synchronize to the point in time when that reference completes.

One mechanism is Immediate Synchronization. In immediate synchronization, the microengine issues the reference and immediately swap out that context. The context will be signaled when the corresponding reference completes. Once signaled, the context will be swapped back in for execution when a context-swap event occurs and it is its turn to run. Thus, from the point of view of a single context's instruction stream, the microword after issuing the mem reference does not get executed until the reference completes.

A second mechanism is Delayed Synchronization. In delayed synchronization, the microengine issues the reference, and then continues to execute some other useful work independent of the reference. Some time later it could become necessary to synchronize the thread's execution stream to the completion of the issued reference before further work is performed. At this point a synchronizing microword is executed that will either swap out the current thread, and swap it back in sometime later when the reference has completed, or continue executing the current thread because the reference has already completed. Delayed synchronization is implemented using two different signaling schemes:

If the memory reference is associated with a transfer register, the signal from which the thread is triggered is generated when the corresponding transfer register valid bit is set or cleared. For example, an SRAM read which deposits data into transfer register A would be signaled when the valid bit for A is set. If the memory reference is associated with the transfer FIFO or the receive FIFO, instead of a transfer register, then the signal is generated when the reference completes in the SDRAM controller 26a. Only one signal state per context is held in the microengines scheduler, thus only one outstanding signal can exist in this scheme.

There are at least two general operational paradigms from which microengine or microcontroller micro-programs could be designed. One would be that overall microengine or microcontroller compute throughput and overall memory bandwidth are optimized at the expense of single thread execution latency. This paradigm would make sense when the system has multiple microengines or microcontrollers executing multiple threads per microengine or microcontroller on unrelated data packets.

A second one is that microcontroller or microengine execution latency should be optimized at the expense of overall micro engine compute throughput and overall memory bandwidth. This paradigm could involve execution of a thread with a real-time constraint, that is, a constraint which dictates that some work must absolutely be done by some specified time. Such a constraint requires that optimization of the single thread execution be given priority over other considerations such as memory bandwidth or overall computational throughput. A real-time thread would imply a single microengine that executes only one thread. Multiple threads would not be handled because the goal is to allow the single real-time thread to execute as soon as possible— execution of multiple threads would hinder this ability.

The coding style of these two paradigms could be significantly different with regard to issuing memory references and context switching. In the real time case, the goal is to issue as many memory references as soon as possible in order to minimize the memory latency incurred by those references. Having issued as many references as early as possible the goal would be to perform as many computations in the microengines as possible in parallel with the references. A computation flow that corresponds to real-time optimization is:

o) issue mem ref 1
o) issue mem ref 2
o) issue mem ref 3
o) perform work independent of mem refs 1, 2 and 3
o) synch to completion of mem ref 1
o) perform work dependent on mem ref 1 and independent of mem ref 2 and 3
o) issue any new mem refs based on preceding work.
o) synch to completion of mem ref 2
o) perform work dependent on mem ref 1 and 2 independent of mem ref 3
o) issue any new mem refs based on preceding work.
o) synch to completion of mem ref 3
o) perform work dependent on the completion of all 3 refs
o) issue any new mem refs based on preceding work.

In contrast, optimization for throughput and bandwidth would take a different approach. With optimization for microengine computational throughput and overall memory bandwidth less consideration is given to single thread execution latency. To accomplish this, the goal would be to equally space memory references across the microprogram for each thread. This would provide a uniform stream of memory references to the SRAM and SDRAM controllers and would maximize the probability that 1 thread is always available to hide the memory latency incurred when another thread is swapped out.

Figure 3C:
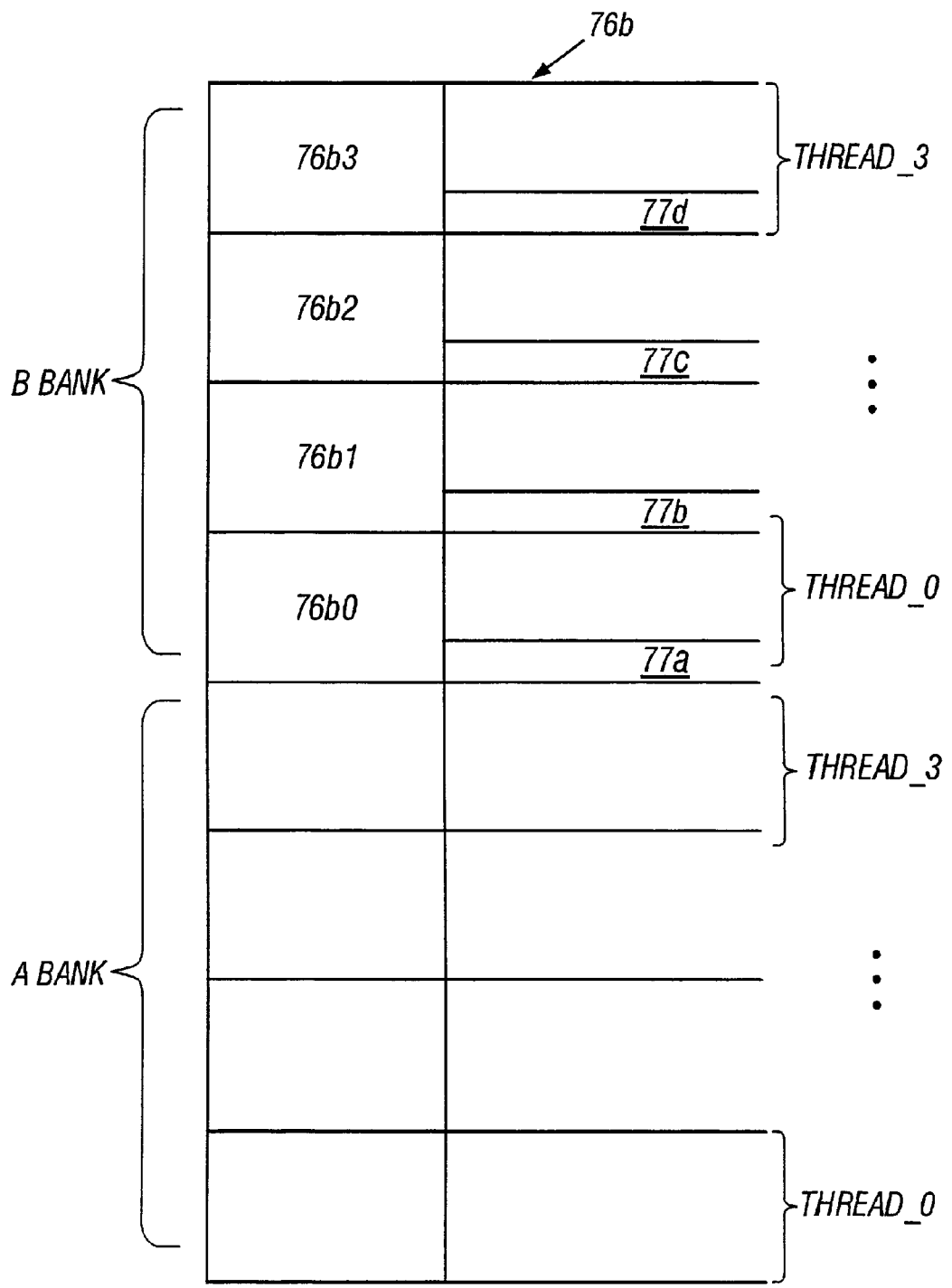
FIG. 3C is a block diagram showing general purpose register address arrangement.

Register-File Address Types:

Referring to FIG. 3C, the two register address spaces that exist are Locally accessible registers, and Globally accessible registers accessible by all microengines. The General Purpose Registers (GPRs) are implemented as two separate banks (A bank and B bank) whose addresses are interleaved on a word-by-word basis such that A bank registers have lsb=0, and B bank registers have lsb=1. Each bank is capable of performing a simultaneous read and write to two different words within its bank.

Across bank, the register set 76b is also organized into four windows 76b0–76b3 of 32 registers that are relatively addressable per thread. Thus, thread_0 will find its register 0 at 77a (register 0), the thread_1 will find its register_0 at 77b (register 32), thread_2 will find its register_0 at 77c (register 64), and thread_3 at 77d (register 96). A similar scheme applies to Bank A but reference numerals are only denoted for Bank B. Relative addressing is supported so that multiple threads can use the exact same control store and locations but access different windows of register and perform different functions. The uses of register window addressing and bank addressing provide the requisite read bandwidth using only dual ported RAMS in the microengine 22f.

These windowed registers do not have to save data from context switch to context switch so that the normal push and pop of a context swap file or stack is eliminated. Context switching here has a 0 cycle overhead for changing from one context to another. Relative register addressing divides the register banks into windows across the address width of the general purpose register set. Relative addressing allows access any of the windows relative to the starting point of the window. Absolute addressing is also supported in this architecture where any one of the absolute registers may be accessed by any of the threads by providing the exact address of the register.

Addressing of general purpose registers 78 can occur in 2 modes depending on the microword format. The two modes are absolute and relative. In absolute mode, addressing of a register address is directly specified in 7-bit source field (a6–a0 or b6–b0):

|  | 7 | 6 | 5 | 4 | 3 | 2 | 1 | 0 |  |
|---|---|---|---|---|---|---|---|---|---|
| A GPR: | a6 | 0 | a5 | a4 | a3 | a2 | a1 | a0 | a6 = 0 |
| B GPR: | b6 | 1 | b5 | b4 | b3 | b2 | b1 | b0 | b6 = 0 |
| SRAM/ASB: | a6 | a5 | a4 | 0 | a3 | a2 | a1 | a0 | a6 = 1, a5 = 0, a4 = 0 |
| SDRAM: | a6 | a5 | a4 | 0 | a3 | a2 | a1 | a0 | a6 = 1, a5 = 0, a4 = 1 | register address directly specified in 8-bit dest field (d7–d0):

|  | 7 | 6 | 5 | 4 | 3 | 2 | 1 | 0 |  |
|---|---|---|---|---|---|---|---|---|---|
| A GPR: | d7 | d6 | d5 | d4 | d3 | d2 | d1 | d0 | d7 = 0, d6 = 0 |
| B GPR: | d7 | d6 | d5 | d4 | d3 | d2 | d1 | d0 | d7 = 0, d6 = 1 |
| SRAM/ASB: | d7 | d6 | d5 | d4 | d3 | d2 | d1 | d0 | d7 = 1, d6 = 0, d5 = 0 |
| SDRAM: | d7 | d6 | d5 | d4 | d3 | d2 | d1 | d0 | d7 = 1, d6 = 0, d5 = 1 |

If <a6:a5>1,1, <b6:b5>=1,1, or <d7:d6>=1,1 then the lower bits are interpreted as a context-relative address field (described below). When a non-relative A or B source address is specified in the A, B absolute field, only the lower half of the SRAM/ASB and SDRAM address spaces can be addressed, effectively, reading absolute SRAM/SDRAM devices. However, since this restriction does not apply to the dest field, writing the SRAM/SDRAM still uses the full address space.

In relative mode, addresses are specified as an address offset within context space as defined by a 5-bit source field (a4–a0 or b4–b0):

|  | 7 | 6 | 5 | 4 | 3 | 2 | 1 | 0 |  |
|---|---|---|---|---|---|---|---|---|---|
| A GPR: | a4 | 0 | context | a3 | a2 | a1 | a0 | | a4 = 0 |
| B GPR: | b4 | 1 | context | b3 | b2 | b1 | b0 | | b4 = 0 |
| SRAM/ASB: | ab4 | 0 | ab3 | context | b2 | b1 | ab0 | | ab4 = 1, ab3 = 0 |
| SDRAM: | ab4 | 0 | ab3 | context | b2 | b1 | ab0 | | ab4 = 1, ab3 = 1 | or as defined by the 6-bit dest field (d5-d0):

|  | 7 | 6 | 5 | 4 | 3 | 2 | 1 | 0 |  |
|---|---|---|---|---|---|---|---|---|---|
| A GPR: | d5 | d4 | context | d3 | d2 | d1 | d0 | | d5 = 0, d4 = 0 |
| B GPR: | d5 | d4 | context | d3 | d2 | d1 | d0 | | d5 = 0, d4 = 1 |
| SRAM/ASB: | d5 | d4 | d3 | context | d2 | d1 | d0 | | d5 = 1, d4 = 0, d3 = 0 |
| SDRAM: | d5 | d4 | d3 | context | d2 | d1 | d0 | | d5 = 1, d4 = 0, d3 = 1 |

If <d5:d4>=1,1, then the destination address does not address a valid register, thus, no dest operand is written back.

The following registers are globally accessible from the microengines and the memory controllers:
hash unit registers
scratchpad and common registers
receive FIFO and receive status FIFO
transmit FIFO
transmit control FIFO The microengines are not interrupt driven. Each microflow executes until completion and then a new flow is chosen based on the state signaled by other devices in the processor 12.

Figure 4A:
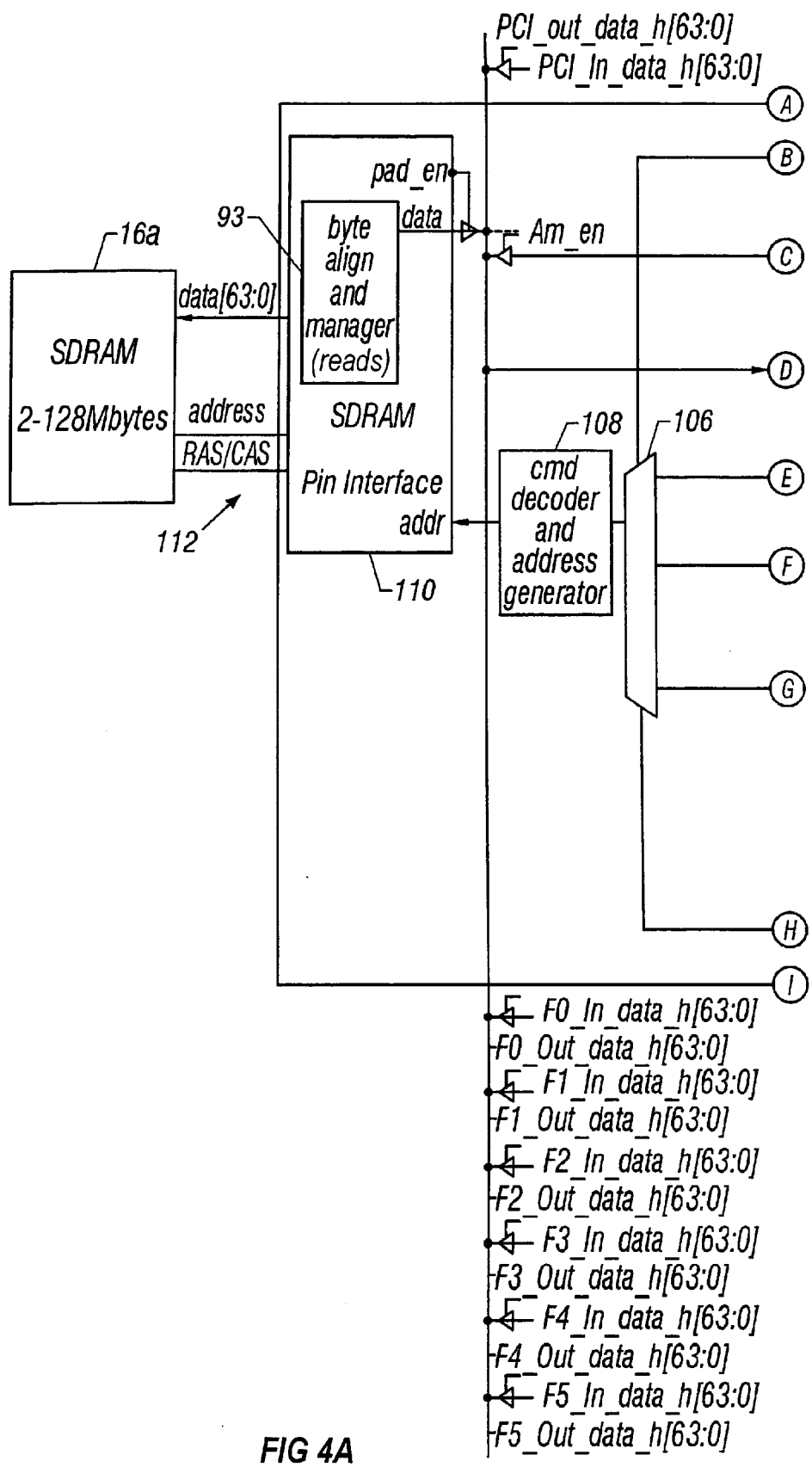
FIGS. 4A–4B are a block diagram of a memory controller for enhanced bandwidth operation used in the hardware-based multithreaded processor.
Figure 4B:
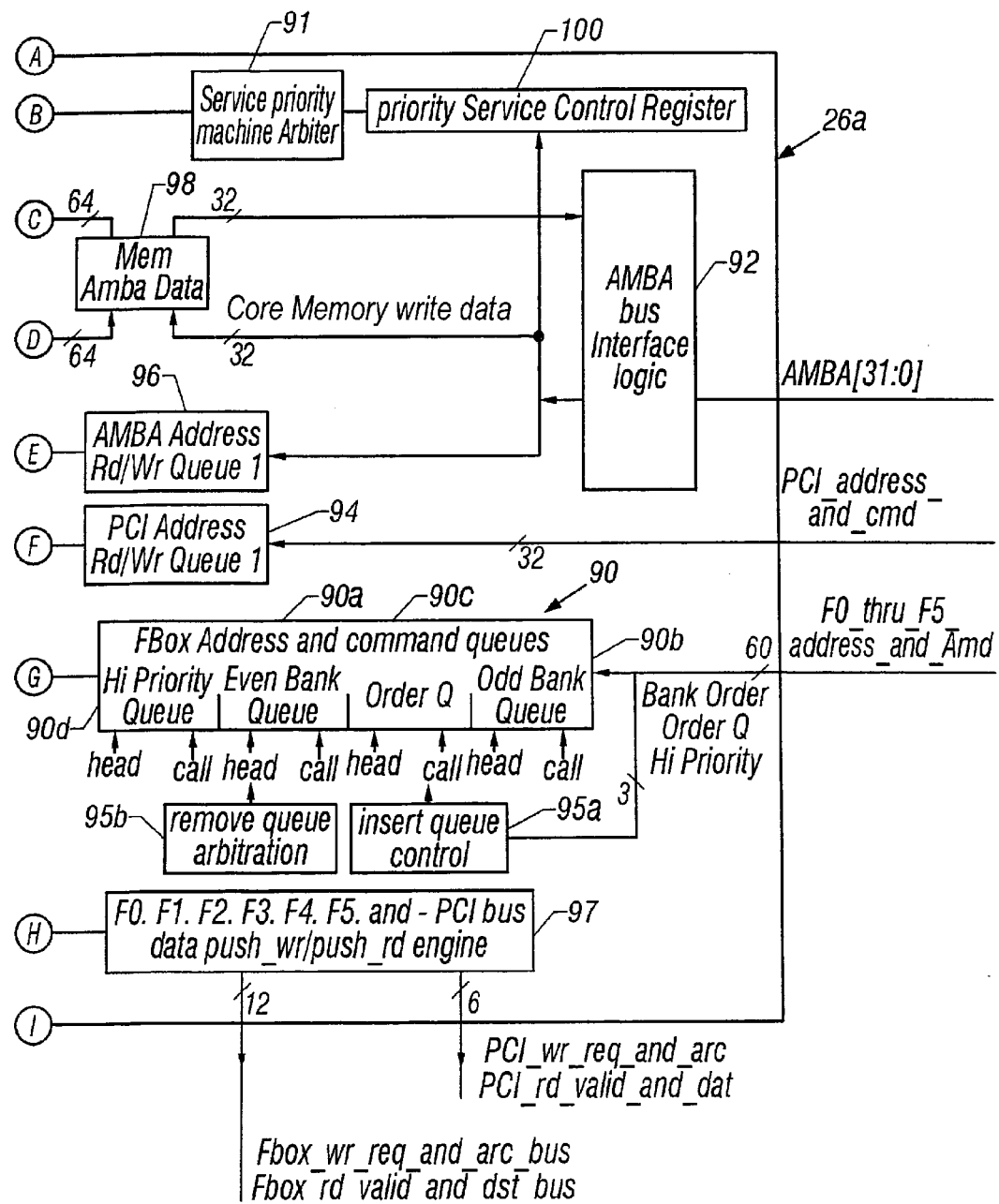

Referring to FIGS. 4A–4B, the SDRAM memory controller 26a includes address and command queues 90 where memory reference requests arrive from the various microengines 22a–22f. The memory controller 26a includes an arbiter 91 that selects the next the microengine reference requests to go to any of the functioning units. Given that one of the microengines is providing a reference request, the reference request will come through the address and command queue 90, inside the SDRAM controller 26a. If the reference request has a bit set called the "optimized MEM bit" the incoming reference request will be sorted into either the even bank queue 90a or the odd bank queue 90b. If the memory reference request does not have a memory optimization bit set, the default will be to go into an order queue 90c. The SDRAM controller 26a is a resource which is shared among the FBUS interface 28, the core processor 20 and the PCI interface 24. The SDRAM controller 26a also maintains a state machine for performing READ-MODIFY-Write atomic operations. The SDRAM controller 26a also performs byte alignment for requests of data from SDRAM.

The order queue 90c maintains the order of reference requests from the microengines. With a series of odd and even banks references, it may be required that a signal is returned only upon completion of a sequence of memory references to both the odd and even banks. If the microengine 22f sorts the memory references into odd bank and even bank references and one of the banks, e.g., the even bank is drained of memory references before the odd bank but the signal is asserted on the last even reference, the memory controller 26a could conceivably signal back to a microengine that the memory request had completed, even though the odd bank reference had not been serviced. This occurrence could cause a coherency problem. The situation is avoided by providing the order queue 90c allowing a microengine to have multiple memory references outstanding of which only its last memory reference needs to signal a completion.

The SDRAM controller 26a also includes a high priority queue 90d. In the high priority queue 90d, an incoming memory reference from one of the microengines goes directly to the high priority queue and is operated upon at a higher priority than other memory references in the other queues. All of these queues, the even bank queue 90a, the odd bank queue 90b, the order queue 90c and the high priority queue, are implemented in a single RAM structure that is logically segmented into four different windows, each window having its own head and tail pointer. Since filling and draining operations are only a single input and a single output, they can be placed into the same RAM structure to increase density of RAM structures. An insert queue control 95a and a remove queue arbitration 95b logic control insert and removal of memory references from the queues.

The SDRAM controller 26a also includes core bus interface logic. The ASB bus interface logic 92 interfaces the core processor 20 to the SDRAM controller 26a. The ASB bus is a bus that includes a 32 bit data path and a 28 bit address path. The data is accessed to and from memory through MEM ASB data device 98, e.g., a buffer. MEM ASB data device 98 is a queue for write data. If there is incoming data from the core processor 20 via ASB interface logic 92, the data can be stored into the MEM ASB device 98 and subsequently removed from MEM ASB device 98 through the SDRAM interface 110 to SDRAM memory 16a. Although not shown, the same queue structure can be provided for the reads. The SDRAM controller 26a also includes an engine 97 to pull data from the microengines and PCI bus.

Additional queues include the PCI address queue 94 and AMBA read/write queue 96 that maintain a number of requests. The memory requests are sent to SDRAM interface 110 via multiplexer 106. The multiplexer 106 is controlled by the SDRAM arbiter 91 which detects the fullness of each of the queues and the status of the requests and from that decides priority based on a programmable value stored in a priority service control register 100.

Once control to the multiplexer 106 selects a memory reference request, the memory reference request is sent to a decoder 108 where it is decoded and an address is generated. The decoded address is sent to the SDRAM interface 110 where it is decomposed into row and column address strobes to access the SDRAM 16a and write or read data over data lines 16a sending data to bus 112. In one implementation, bus 112 is actually two separate buses instead of a single bus. The separate buses would include a read bus coupling the distributed microengines 22a–22f and a write bus coupling the distributed microengines 22a–22f.

A feature of the SDRAM controller 26a is that when a memory reference is stored in the queues 90, in addition to the optimized MEM bit that can be set, there is a "chaining bit". The chaining bit when set allows for special handling of contiguous memory references. As previously mentioned, the arbiter 12 controls which microengine will be selected to provide memory reference requests over the command bus to queue 90 (FIG. 4B). Assertion of the chain bit will control the arbiter to have the arbiter select the functional unit which previously requested that bus because setting of the chain bit indicates that the microengine issued a chain request.

Contiguous memory references will be received in queue 90 when the chaining bit is set. Those contiguous references will typically be stored in the order queue 90c because the contiguous memory references are multiple memory references from a single thread. In order to provide synchronization, the memory controller 26a need only signal at the end of the chained SDRAM references when done. However, in an optimized memory chaining, (e.g., when optimized MEM bit and chaining bit are set) the memory references could go into different banks and potentially complete on one of the banks issuing the signal "done" before the other bank was fully drained, thus destroying coherency. Therefore, the chain bit is used by the controller 110 to maintain the memory references from the current queue.

Figure 4C:
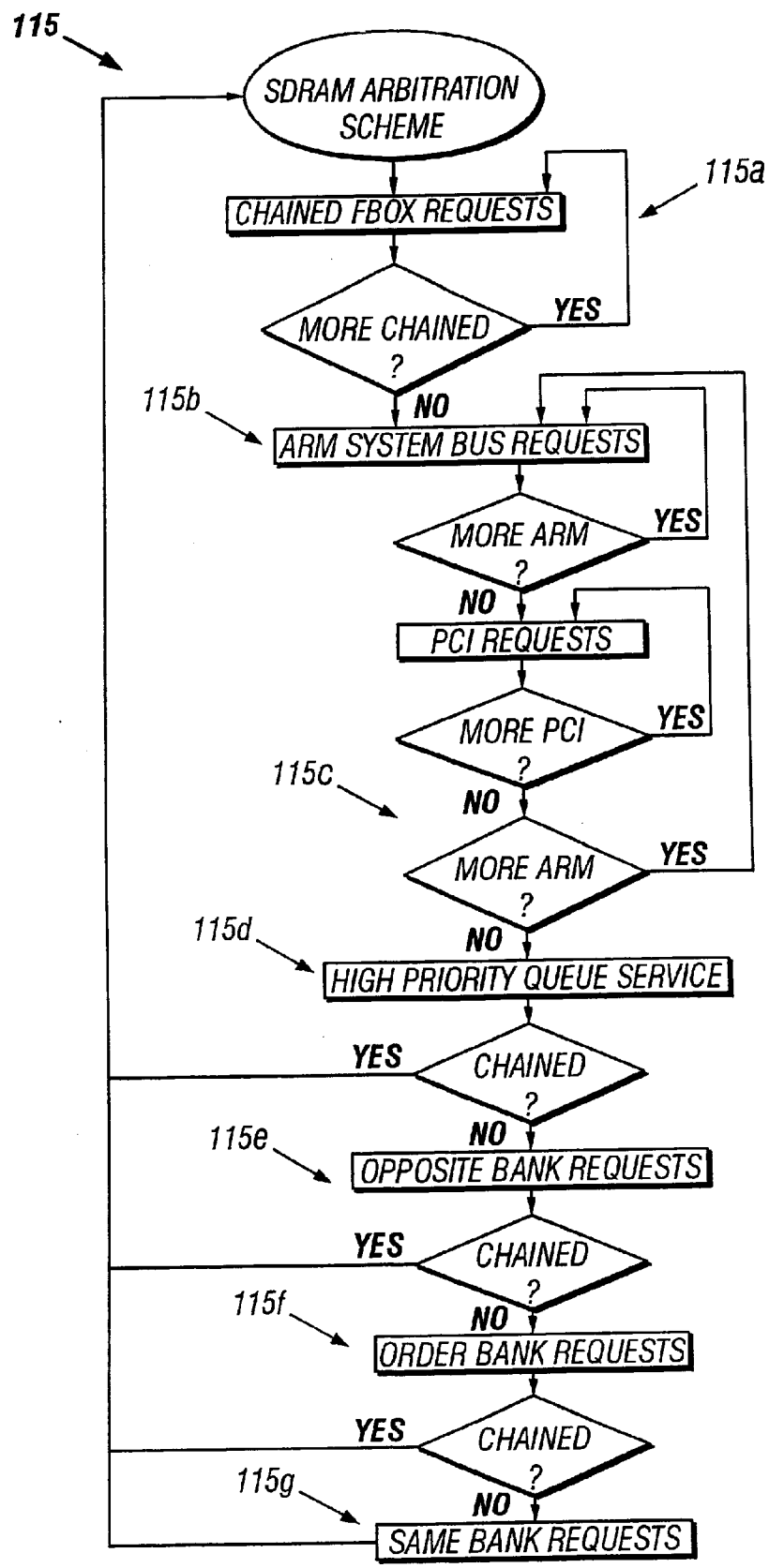
FIG. 4C is a flow chart that represents an arbitration policy in an SDRAM controller of FIGS. 4A–4B.

Referring to FIG. 4C, a flow representation of the arbitration policy in the SDRAM controller 26a is shown. The arbitration policy favors chained microengine memory requests. The process 115 starts by examining for Chained microengine memory reference requests at service stops or step 115a. The process step 115 stays at the chained requests until the chain bit is cleared. The process examines ASB bus requests step 115b followed by PCI bus requests 115c, High Priority Queue Service step 115d, Opposite Bank Requests step 115e, Order Queue Requests step 115f, and Same Bank Requests step 115g. Chained request are serviced completely, whereas services steps 115b–115d are serviced in round robin order. Only when services steps 115a–115d are fully drained does the process handle services steps 115e–115g. Chained microengine memory reference requests are when the previous SDRAM memory request has the chain bit set. When the chain bit is set then the arbitration engine simply services the same queue again, until the chain bit is cleared. The ASB bus has higher priority than the PCI bus due to the severe performance penalty imposed on the StrongArm core when the ASB bus is in wait state. PCI has higher priority than the microengines due to the latency requirements of PCI. However with other buses, the arbitration priority could be different.

Figure 4D:
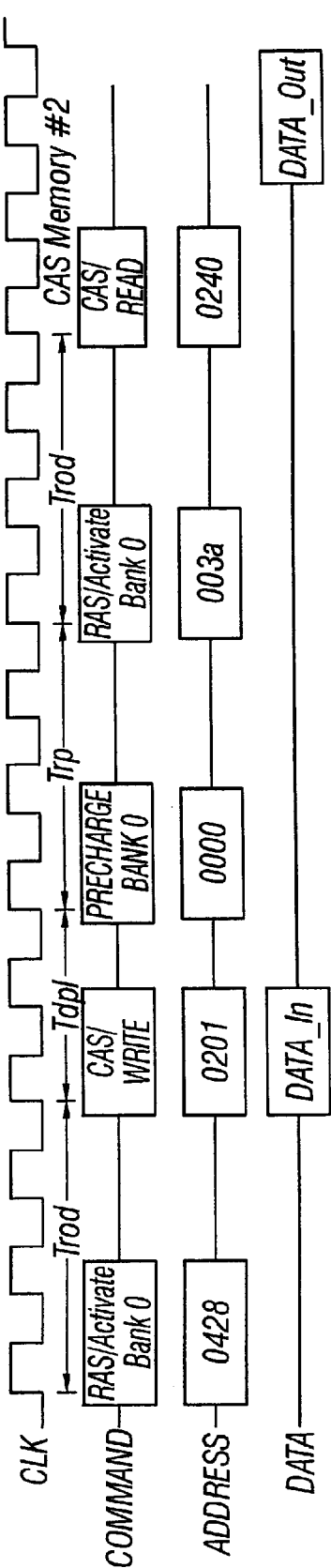
FIG. 4D is a timing diagram that shows advantages of optimizing the SDRAM controller of FIGS. 4A–4B.
Figure 4D:
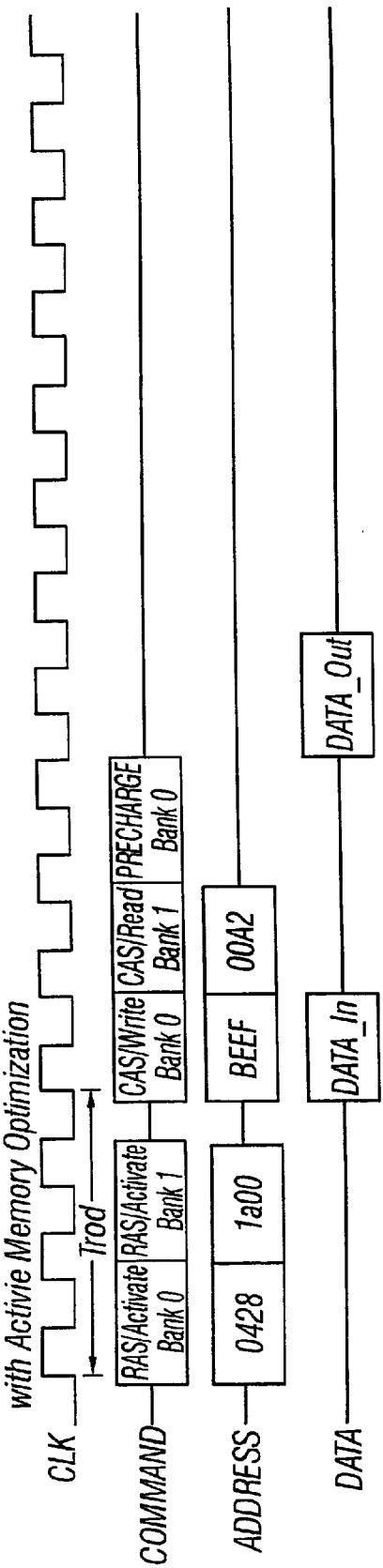

As shown in FIG. 4D, typical timing of a memory without active memory optimization and with active memory optimization is shown. As can be seen, the use of active memory optimizations maximizes the use of the bus and thus hides the inherent latency within physical SDRAM devices. In this example, a non-optimized access can take 14 cycles while optimized access can take 7 cycles.

Figure 5A:
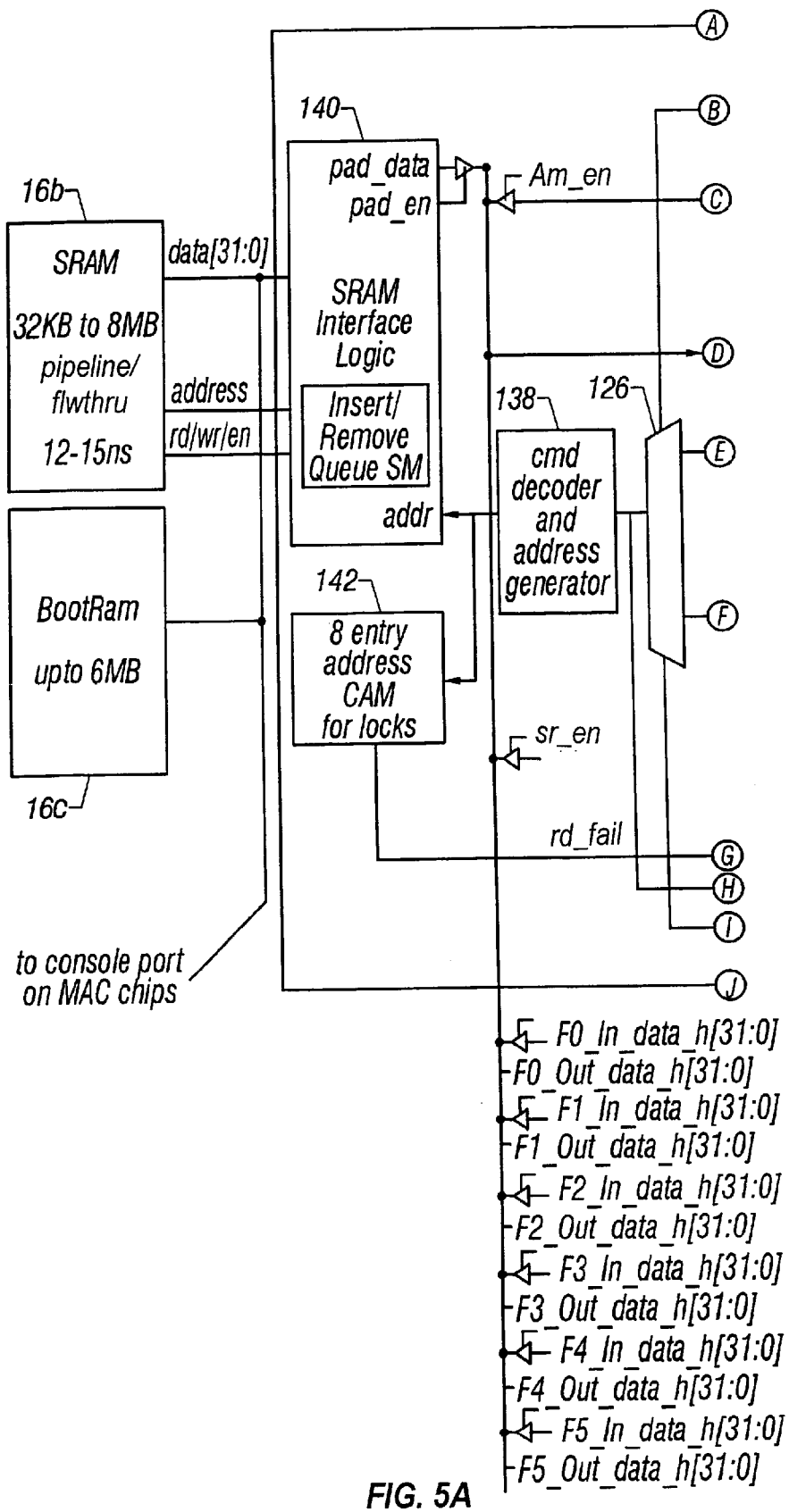
FIGS. 5A–5B are a block diagram of a memory controller for latency limited operations used in the hardware-based multithreaded processor.
Figure 5B:
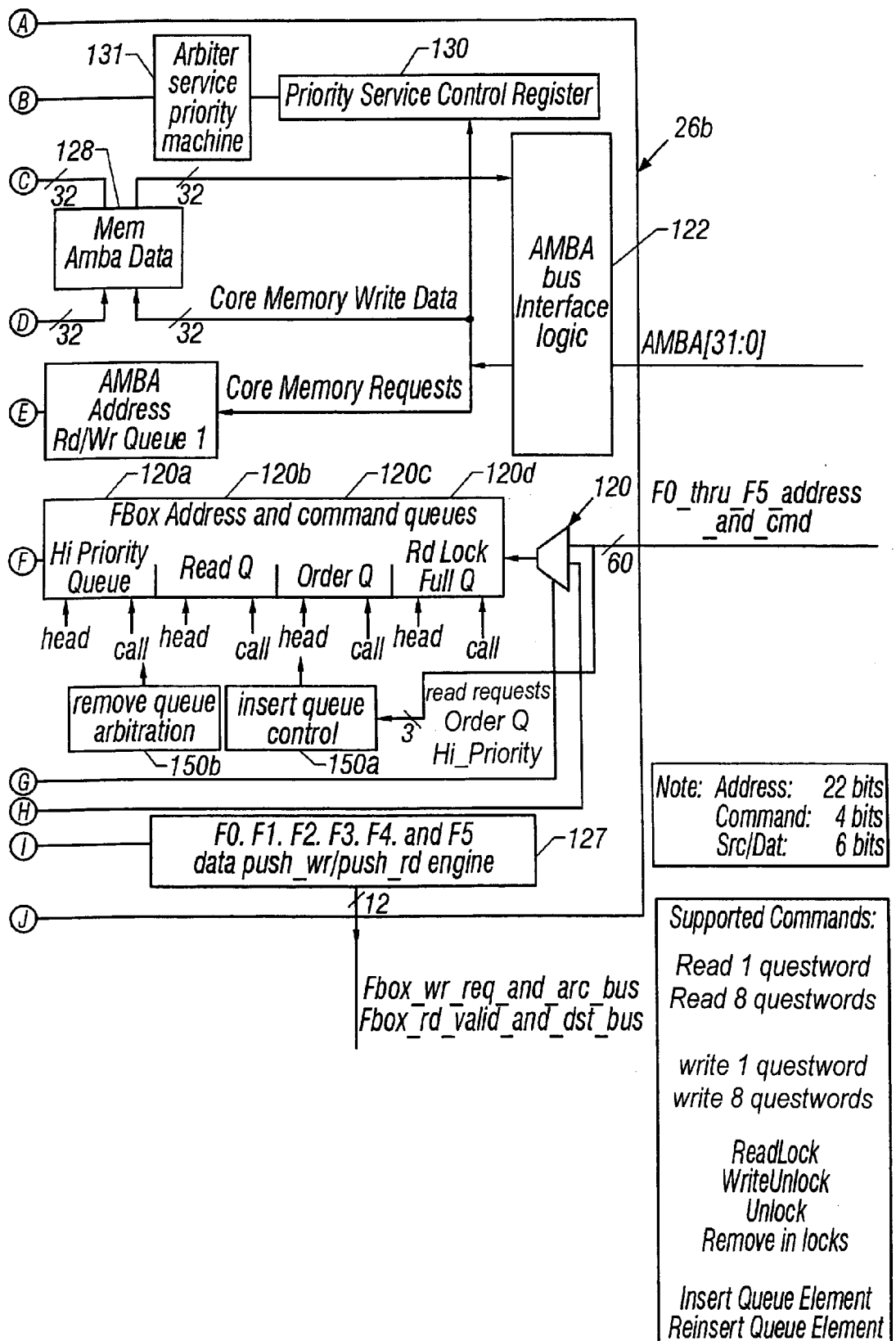

Referring to FIGS. 5A–5B, the memory controller 26b for the SRAM is shown. The memory controller 26b includes an address and command queue 120. While the memory controller 26a (FIGS. 4A–4B) has a queue for memory optimization based on odd and even banking, memory controller 26b is optimized based on the type of memory operation, i.e., a read or a write. The address and command queue 120 includes a high priority queue 120a, a read queue 120b which is the predominant memory reference function that an SRAM performs, and an order queue 120c which in general will include all writes to SRAM and reads that are to be non-optimized. Although not shown, the address and command queue 120 could also include a write queue. An insert queue control 150a and a remove queue arbitration 150b logic control insert and removal of memory references from the queues.

The SRAM controller 26b also includes core bus interface The ASB bus interface logic 122 interfaces the core processor 20 to the SRAM controller 26b. The ASB bus is a bus that includes a 32 bit data path and a 28 bit address path. The data is accessed to and from memory through MEM ASB data device 128, e.g., a buffer. MEM ASB data device 128 is a queue for write data. If there is incoming data from the core processor 20 via ASB interface logic 122, the data can be stored into the MEM ASB device 128 and subsequently removed from MEM ASB device 128 through SRAM interface 140 to SRAM memory 16b. Although not shown, the same queue structure can be provided for reads. The SRAM controller 26b also includes an engine 127 to pull data from the microengines and PCI bus.

The memory requests are sent to SRAM interface 140 via multiplexer 126. The multiplexer 126 is controlled by the SRAM arbiter 131 which detects the fullness of each of the queues and the status of the requests and from that decides priority based on a programmable value stored in a priority service control register 130. Once control to the multiplexer 126 selects a memory reference request, the memory reference request is sent to a command decoder and address generator 138 where it is decoded and an address is generated.

The SRAM Unit 26b maintains control of the Memory Mapped off-chip SRAM and Expansion read only memory (ROM). The SRAM controller 26b can address, e.g., 16 MBytes, with, e.g., 8 MBytes mapped for SRAM 16b, and 8 MBytes reserved for special functions including: Boot space via flashROM 16c; and Console port access for MAC devices 13a, 13b and access to associated (RMON) counters. The SRAM is used for local look-up tables and queue management functions.

The SRAM controller 26b supports the following transactions:

| | | |
|---|---|---|
| Microengine requests | (via private bus) | to/from SRAM. |
| Core Processor | (via ASB bus) | to/from SRAM. |

The SRAM controller 26b performs memory reference sorting to minimize delays (bubbles) in the pipeline from the SRAM interface 140 to SRAM 16b. The SRAM controller 26b does memory reference sorting based on the read function. A bubble can either be 1 or 2 cycles depending on the type of memory device employed.

The SRAM controller 26b includes a lock lookup device 142 which is an eight (8 entry address) content addressable memory (CAM) for look-ups of read locks. Each position includes a valid bit that is examined by subsequent read-lock requests. The address and command queue 120 also includes a Read Lock Fail Queue 120d. The Read Lock Fail Queue 120d is used to hold read memory reference requests that fail because of a lock existing on a portion of memory. That is, one of the microengines issues a memory request that has a read lock request that is processed in address and control queue 120. The memory request will operate on either the order queue 120c or the read queue 120b and will recognize it as a read lock request. The controller 26b will access lock lookup device 142 to determine whether this memory location is already locked. If this memory location is locked from any prior read lock request, then this memory lock request will fail and will be stored in the read lock fail queue 120d. If it is unlocked or if device 142 shows no lock on that address, then the address of that memory reference will be used by the SRAM interface 140 to perform a traditional SRAM address read/write request to SRAM 16b. The command decoder and address generator 138 will also enter the lock into the lock look up device 142 so that subsequent read lock requests will find the memory location locked. A memory location is unlocked by operation of a microcontrol instruction in a program after the need for the lock has ended. The location is unlocked by clearing the valid bit in the CAM. After an unlock, the read lock fail queue 120d becomes the highest priority queue giving all queued read lock misses a chance to issue a memory lock request.

Figure 5C:
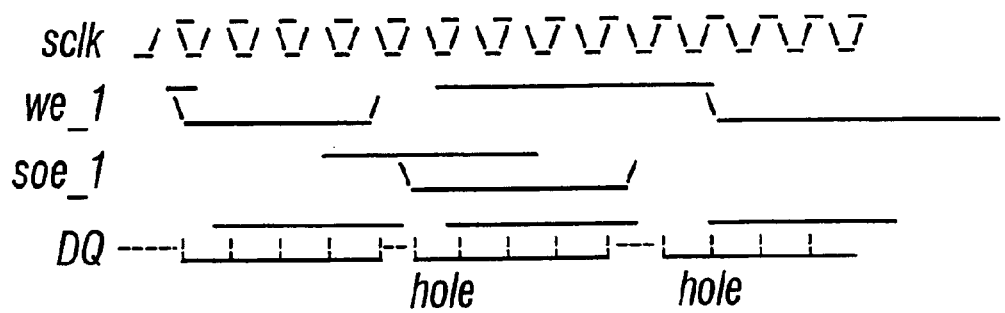
FIG. 5C is a timing diagram that shows advantages of optimizing the SRAM controller of FIG. 1.
Figure 5C:
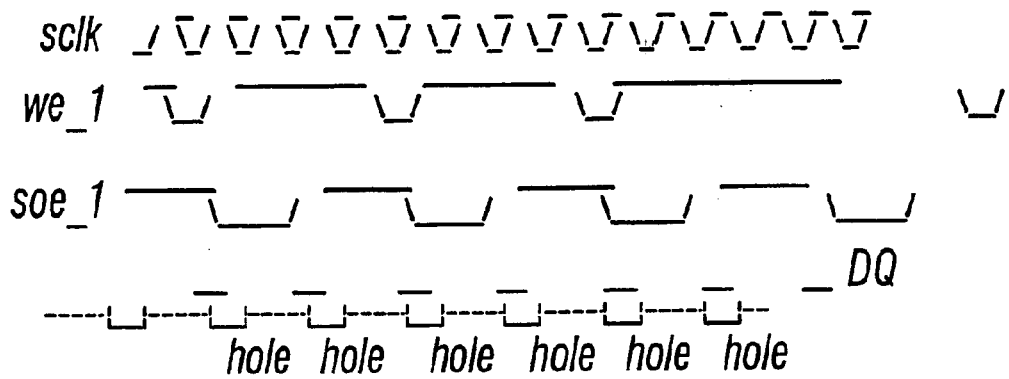
Figure 6A:
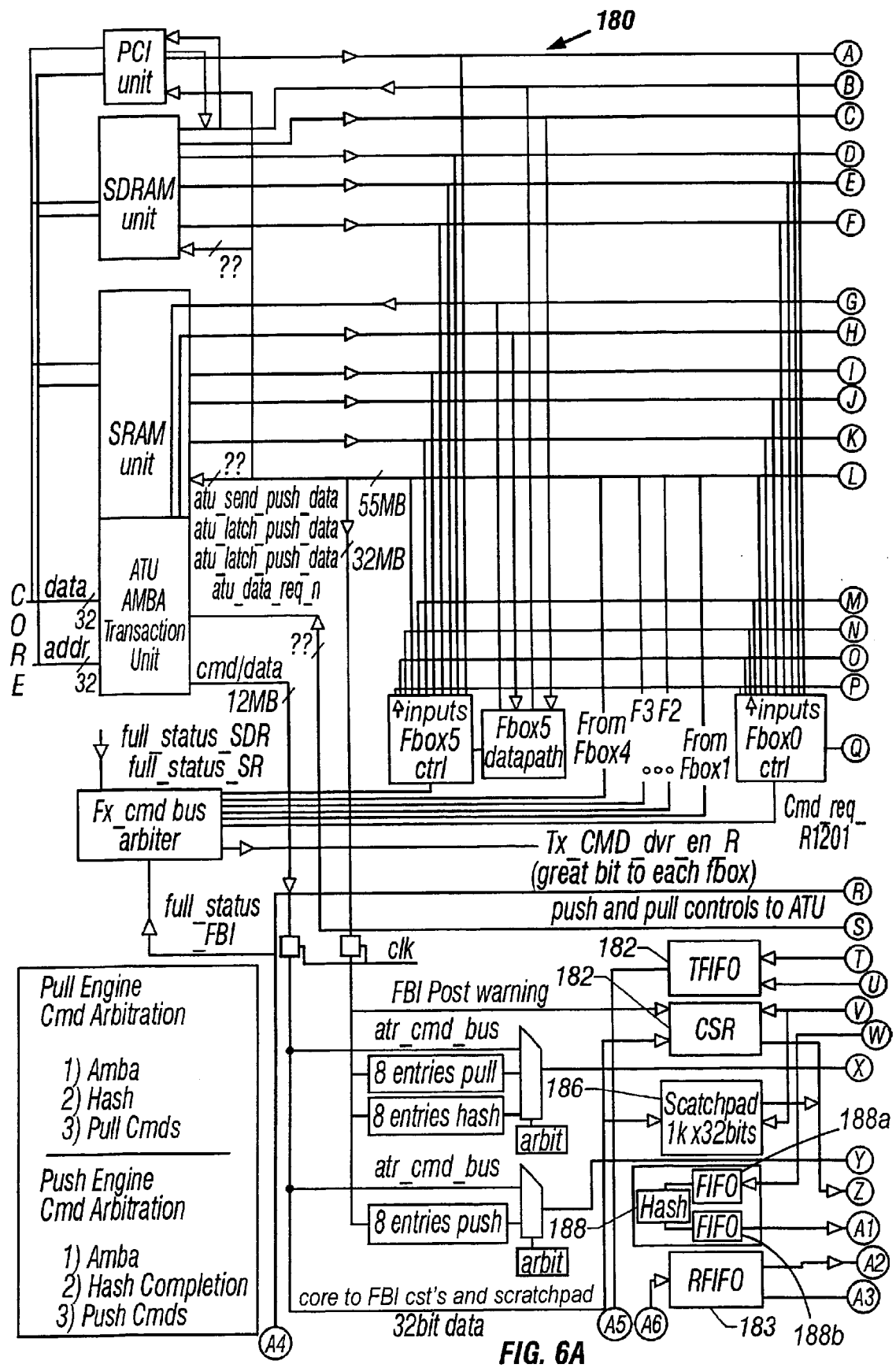
FIGS. 6A–6D are a block diagram of a communication bus interface in the processor of FIG. 1.
Figure 6B:
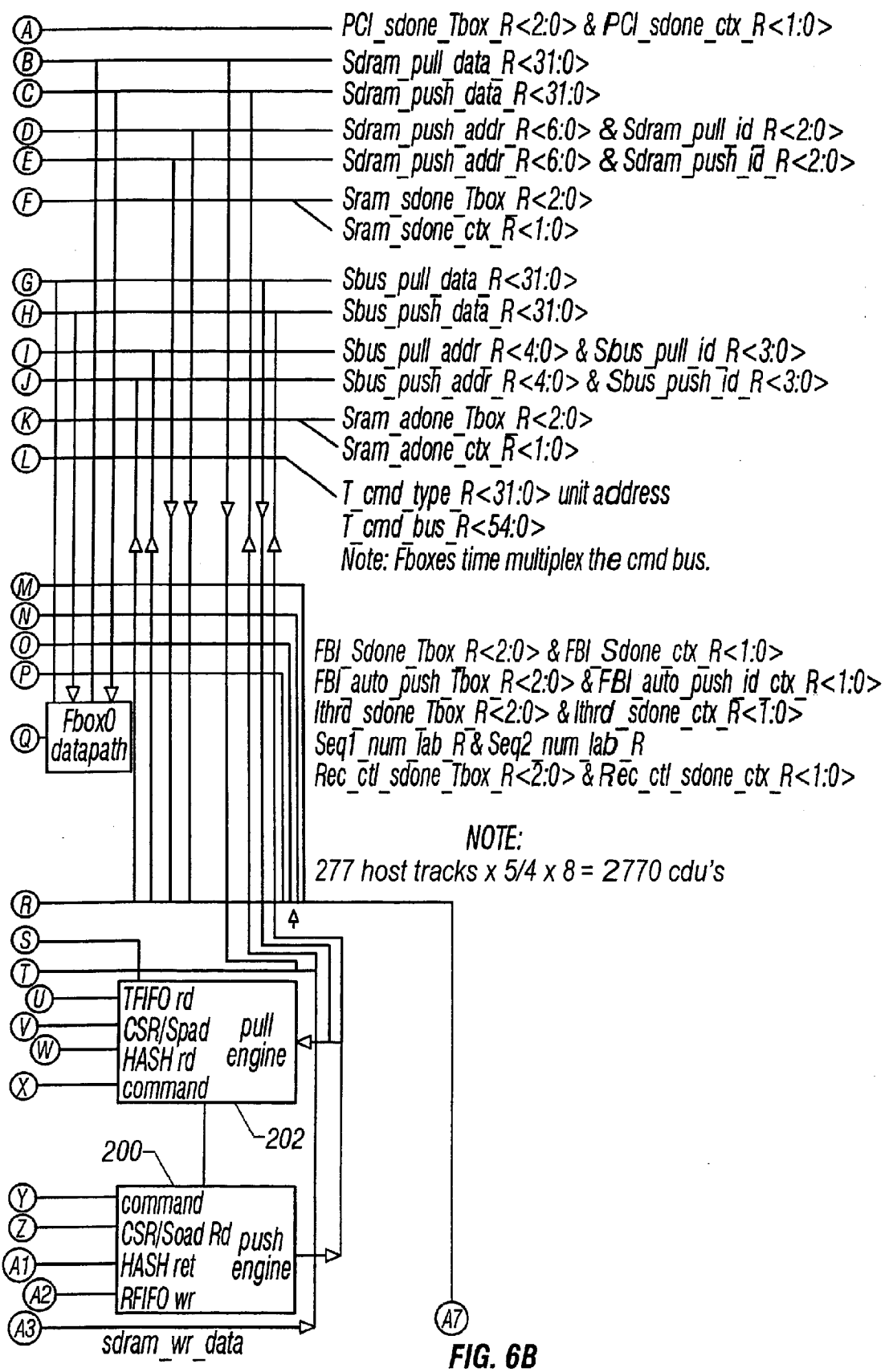
Figure 6C:
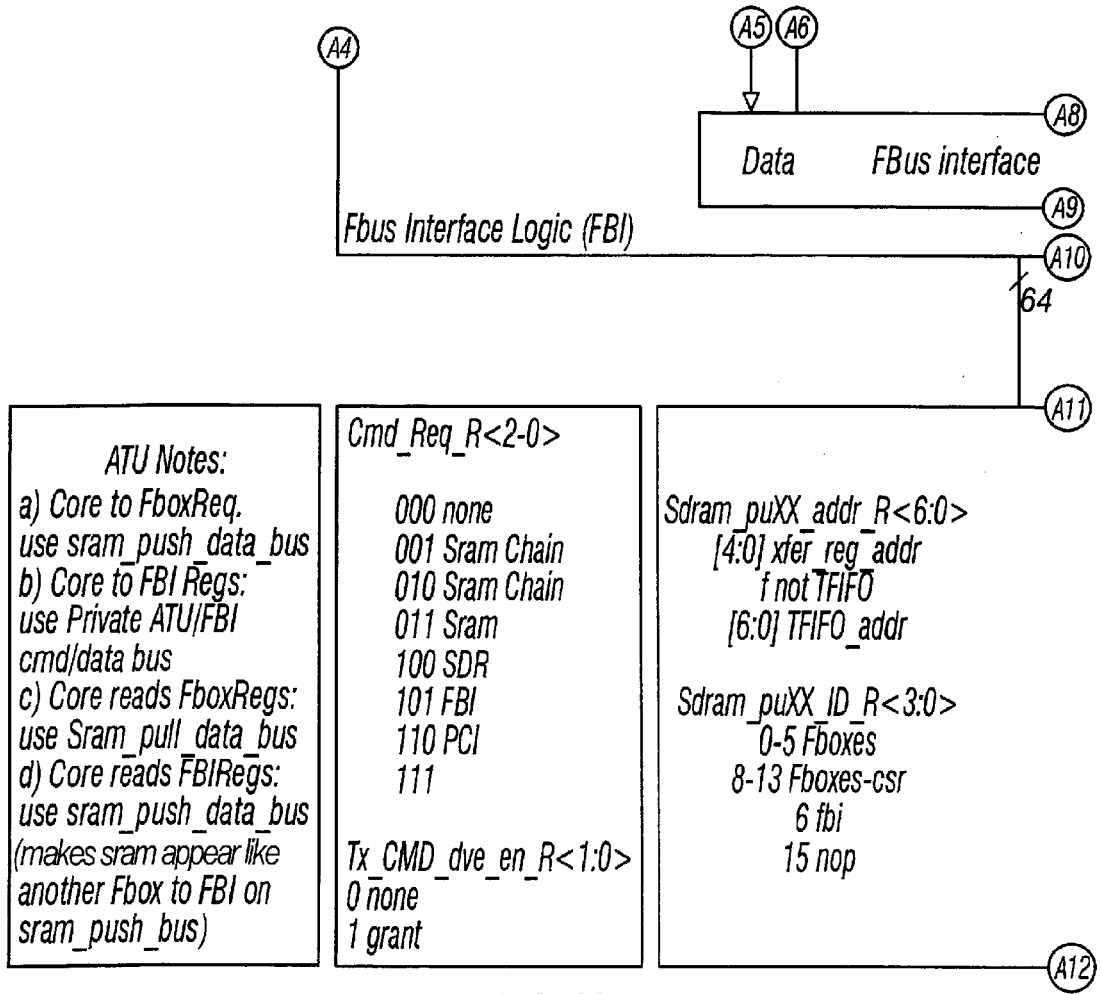
Figure 6D:
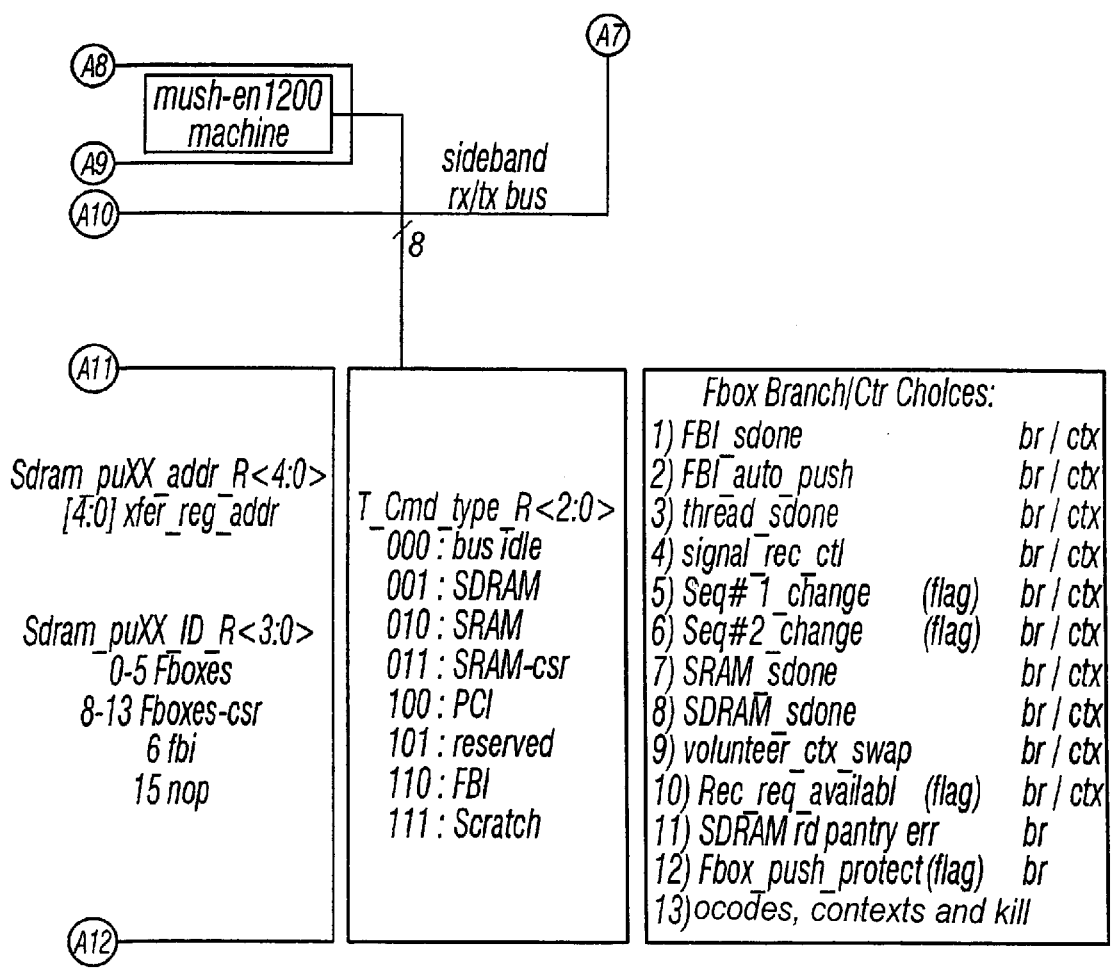

As shown in FIG. 5C, typical timing of a static random access memory without active memory optimization and with active memory optimization is shown. As can be seen, grouping reads and writes improves cycletime eliminating dead cycles.

Referring to FIGS. 6A–6D, communication between the microengines 22 and the FBUS interface Logic (FBI) is shown. The FBUS interface 28 in a network application performs header processing of incoming packets from the FBUS 18. A key function which the FBUS interface performs is extraction of packet headers, and a microprogrammable source/destination/protocol hashed lookup in SRAM. If the hash does not successfully resolve, the packet header is promoted to the core processor 20 for more sophisticated processing.

The FBI 28 contains a Transmit FIFO 182, a Receive FIFO 183, a HASH unit 188 and FBI control and status registers (CSR) 189. These four units communicate with the microengines 22, via a time-multiplexed access to the SRAM bus 38 which is connected to the transfer registers 78, 80 (FIG. 3) in the microengines. That is, all communications to and from the microengines are via the transfer registers 78, 80. The FBUS interface 28 includes a push state machine 200 for pushing data into the transfer registers during the time cycles which the SRAM is NOT using the SRAM data bus (part of bus 38) and a pull state machine 202 for fetching data from the transfer registers in the respective microengine.

The Hash 188 unit includes a pair of FIFO's 188a, 188b. The hash unit determines that the FBI 28 received an FBI_hash request. The hash unit 188 fetches hash keys from the calling microengine 22. After the keys are fetched and hashed, the indices are delivered back to the calling microengine 22. Up to three hashes are performed under a single FBI_hash request. The busses 34 and 38 are each unidirectional: SDRAM_push/pull_data, and Sbus_push/pull_data. Each of these busses requires control signals which will provide read/write controls to the appropriate microengine 22 Transfer registers.

Generally, transfer registers require protection from the context controlling them to guarantee read correctness. In particular, if a write transfer register is being used by a thread_1 to provide data to the SDRAM 16a, thread_1 must not overwrite this register until the signal back from SDRAM controller 26a indicates that this register has been promoted and may now be re-used. Every write does not require a signal back from the destination indicating that the function has been completed, because if the thread writes to the same command queue at that destination with multiple requests, the order of the completion is guaranteed within that command queue, thus only the last command requires the signaling back to the thread. However, if the thread uses multiple command queues (order and read), then these command requests must be broken into separate context tasks, so that ordering is maintained via context swapping. The exception case indicated at the beginning of this paragraph is relative to a certain class of operations using an unsolicited PUSH to transfer registers from the FBUS interface Logic (FBI) for FBUS status information. In order to protect read/write correctness on the transfer registers, the FBI provides a special Push_protect signal when these special FBI push operations are set up.

Any microengine 22 that uses the FBI unsolicited push technique must test the protection flag prior to accessing the FBUS interface/microengine agreed upon transfer registers. If the flag is not asserted, then the transfer registers may be accessed by the microengine. If the flag is Asserted then the context should wait N cycles prior to accessing the registers. Initially, this count is determined by the number of transfer registers being pushed, plus a frontend protection window. The basic idea is that the microengine must test this flag then quickly move the data which it wishes to read from the read transfer registers to GPR's in contiguous cycles, so the push engine does not collide with the microengine read.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of controlling a random access memory (RAM), the method comprising:
receiving memory references from a plurality of microcontrol functional units at an address and command queue, said address and command queue comprising a read queue; and
holding memory references from a core processor in a first read/write queue;
detecting the fullness of the queues and a status of completion of outstanding memory references; and
selecting a memory reference from one of the queues.

2. The method of claim 1, further comprising entering a lock for a memory address for an issued memory reference into the content addressable memory.

3. The method of claim 1, wherein the random access memory comprises Static Random Access Memory (SRAM).

4. The method of claim 1, wherein the selecting comprises selecting one of the queues to provide a next memory reference based on a priority service value.

5. The method of claim 1, wherein the address and command queue further comprises a high priority queue that holds memory references from high priority tasks.

6. The method of claim 1, further comprising sorting the memory references into read and write memory references at the microcontrol functional units.

7. The method of claim 1, wherein the address and command queue further comprises an order queue, the method further comprising sorting the incoming memory reference requests into either the read queue or the order queue.

8. The method of claim 1, further comprising:
determining if a memory reference request has a memory optimization identifier; and based on the determining, storing the memory reference in an order queue.

9. The method of claim 1, wherein the address and command queue is implemented in a single memory structure segmented into different queue regions having respective head and tail pointers and comprises:
an order queue for storing memory references; and
a high priority queue for storing memory references.

10. The method of claim 1, further comprising controlling a memory interface based on the selected memory reference.

11. The method of claim 10, further comprising accessing a content addressable memory that stores identification of read locks.

12. The method of claim 11, wherein the address and command queue further comprises a Read Lock Fail Queue to hold read lock memory reference requests that fail because of a preexisting lock on a portion of memory.

13. The method of claim 12, further comprising accessing the content addressable memory to determine whether the memory location is already locked in response to a read lock request issued by one of the microcontrol functional units.

14. The method of claim 13, further comprising storing the issued memory lock request in the Read Look Fail Queue if the memory location is locked.

15. The method of claim 13, further comprising converting the reference into address signals for the memory if the memory location is not locked.

16. A system, comprising:
at least one Ethernet media access controller (MAC); and
a network processor communicatively coupled to the at least one Ethernet MAC, the network processor comprising:
a core processor;
multiple microengines;
a Static Random Access Memory (SRAM) controller, logic of the controller to:
receive memory references from the multiple microengines;
add queue entries for the received memory references, the controller having access to a read queue and a first read/write queue that holds memory references from the core processor;
detect the fullness of the queues and a status of completion of outstanding memory references; and
select a memory reference from one of the queues in response to detecting.

17. The system of claim 16, wherein the microengines process data packets received via the at least one Ethernet MAC.

18. The system of claim 16, wherein the controller has access to a read lock fail queue.

* * * * *